(12) United States Patent
Saito et al.

(10) Patent No.: US 9,170,409 B2
(45) Date of Patent: Oct. 27, 2015

(54) ZOOM LENS AND IMAGING APPARATUS

(71) Applicant: FUJIFILM Corporation, Tokyo (JP)

(72) Inventors: Hiroki Saito, Saitama-ken (JP); Michio Cho, Saitama-ken (JP); Toru Ito, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/175,333

(22) Filed: Feb. 7, 2014

(65) Prior Publication Data

US 2014/0153110 A1 Jun. 5, 2014

Related U.S. Application Data

(63) Continuation of application No. PCT/JP2012/005372, filed on Aug. 28, 2012.

(30) Foreign Application Priority Data

Aug. 29, 2011 (JP) ................. 2011-185740

(51) Int. Cl.
*G02B 15/177* (2006.01)
*G02B 15/16* (2006.01)
*G02B 27/64* (2006.01)

(52) U.S. Cl.
CPC ............ *G02B 15/161* (2013.01); *G02B 15/177* (2013.01); *G02B 27/646* (2013.01); *G03B 2205/0046* (2013.01)

(58) Field of Classification Search
CPC .. G02B 13/009; G02B 15/161; G02B 15/163; G02B 15/177
USPC ............ 359/680, 682, 686, 689, 691
See application file for complete search history.

(56) References Cited

U.S. PATENT DOCUMENTS

| | | | |
|---|---|---|---|
| 4,540,249 A | 9/1985 | Mogami | |
| 4,743,103 A | 5/1988 | Estelle | |
| 5,877,901 A | 3/1999 | Enomoto et al. | |
| 6,169,635 B1 | 1/2001 | Ozaki et al. | |
| 6,268,964 B1 * | 7/2001 | Ozaki et al. .................. | 359/685 |
| 2003/0234985 A1 | 12/2003 | Sato | |

(Continued)

FOREIGN PATENT DOCUMENTS

| | | |
|---|---|---|
| JP | 58-005707 | 1/1983 |
| JP | 58-121011 | 7/1983 |

(Continued)

OTHER PUBLICATIONS

International Search Report, PCT/JP2012/005372, Nov. 27, 2012.

(Continued)

*Primary Examiner* — Darryl J Collins

(74) *Attorney, Agent, or Firm* — Young & Thompson

(57) ABSTRACT

A zoom lens includes: a first lens group having a negative refractive power; and a second lens group having a positive refractive power, provided in this order from an object side. Magnification is changed by moving the first lens group and the second lens group. The first lens group includes a first lens having a negative refractive power, a second lens, a third lens having a negative refractive power, and a fourth lens having a positive refractive power, provided in this order from the object side. The zoom lens satisfies predetermined conditional formulae.

16 Claims, 13 Drawing Sheets

(56) References Cited

U.S. PATENT DOCUMENTS

| | | |
|---|---|---|
| 2008/0106801 A1 | 5/2008 | Kang et al. |
| 2010/0039710 A1 | 2/2010 | Wei |

FOREIGN PATENT DOCUMENTS

| | | |
|---|---|---|
| JP | 1-503568 | 11/1989 |
| JP | 4-163414 | 6/1992 |
| JP | 11-223768 | 8/1999 |
| JP | 2004-021223 | 1/2004 |
| JP | 2006-113300 | 4/2006 |
| JP | 2008-065051 | 3/2008 |
| JP | 2008-116915 | 5/2008 |
| JP | 2010-044235 | 2/2010 |

OTHER PUBLICATIONS

JP Office Action, dated Jun. 22, 2015; Application No. 2013-531076.

* cited by examiner

ZOOM LENS AND IMAGING APPARATUS

CROSS REFERENCE TO RELATED APPLICATIONS

This application is a continuation of PCT/JP2012/005372 filed on Aug. 28, 2012, which claims foreign priority to Japanese Application No. 2011-185740 filed on Aug. 29, 2011. The entire contents of each of the above applications are hereby incorporated by reference.

TECHNICAL FIELD

The present invention is related to a zoom lens. Particularly, the present invention is related to a zoom lens which can be favorably utilized in miniature video cameras.

The present invention is also related to an imaging apparatus equipped with such a zoom lens.

BACKGROUND ART

Conventionally, zoom lenses of the two group type, constituted by a first lens group having a negative refractive power and a second lens group having a positive refractive power in this order from an object side, that change magnification by moving the first lens group and the second lens group in the direction of the optical axis, are known as zoom lenses having variable magnification ratios of approximately 2.5× and wide angles. This type of zoom lens is favorably employed for miniature video cameras and the like.

For example, U.S. Pat. No. 5,877,901 discloses a zoom lens of the two group type having four lenses in a first lens group (Example 5). The first lens group of this zoom lens has a negative lens (a lens having a negative refractive power), a negative lens, a negative lens, and a positive lens (a lens having a positive refractive power), in this order from the object side.

U.S. Patent Application Publication No. 20030234985 discloses a zoom lens of the two group type having four lenses in a first lens group (Example 1). The first lens group of this zoom lens has a negative lens, a positive lens, a negative lens, and a positive lens, in this order from the object side.

Japanese Unexamined Patent Publication No. 2008-065051 discloses a zoom lens of the two group type having four lenses in a first lens group and four lenses in a second lens group (Example 4). The first lens group of this zoom lens has a negative lens, a negative lens, a negative lens, and a positive lens, in this order from the object side. The second lens group of this zoom lens has a positive lens, a positive lens, a negative lens, and a positive lens, in this order from the object side.

U.S. Pat. No. 6,169,635 discloses a zoom lens of the two group type having four lenses in a first lens group and four lenses in a second lens group (Example 4). The first lens group of this zoom lens has a negative lens, a positive lens, a negative lens, and a positive lens, in this order from the object side. The second lens group of this zoom lens has a positive lens, a positive lens, a negative lens, and a positive lens, in this order from the object side.

SUMMARY OF THE INVENTION

The following problems are recognized to exist in the aforementioned conventional zoom lenses. The zoom lens disclosed in U.S. Pat. No. 5,877,901 has a small variable magnification ratio. The zoom lens disclosed in U.S. Patent Application Publication No. 20030234985 has a wide angle of view but a small variable magnification ratio and a high F value. The zoom lens disclosed in Japanese Unexamined Patent Publication No. 2008-065051 has a wide angle of view and a large variable magnification ratio, but there is room for improvement from the viewpoint of distortion. The zoom lens disclosed in U.S. Pat. No. 6,169,635 has a narrow angle of view and a high F value.

The present invention has been developed in view of the foregoing circumstances. It is an object of the present invention to provide a zoom lens having a small F value, in which the angle of view is easily widened and distortion is favorably corrected.

It is another object of the present invention to provide an imaging apparatus having favorable optical performance and that can achieve a wide angle of view by employing such a zoom lens.

A first zoom lens according to the present invention substantially consists of:

a first lens group having a negative refractive power; and a second lens group having a positive refractive power, provided in this order from an object side;

the first lens group and the second lens group being moved to change magnification;

the first lens group substantially consisting of a first lens having a negative refractive power, a second lens, a third lens having a negative refractive power, and a fourth lens having a positive refractive power, in this order from the object side; and the zoom lens satisfying the following conditional formulae:

$$-0.04 < fw/f_{G12} < 0.50 \quad (1\text{-}1)$$

$$-0.19 < f_1/f_{G12} < 0.50 \quad (2\text{-}1)$$

wherein $f_{G12}$ is the focal length of the second lens from the object side within the first lens group, fw is the focal length of the entire system at a wide angle end, and $f_1$ is the focal length of the first lens group.

Note that the expression "substantially consists of a first lens group and a second lens group" means that the zoom lens may also include lenses that practically do not have any power, optical elements other than lenses such as aperture stops and cover glass, and mechanical components such as lens flanges, a lens barrel, an imaging device, a blur correcting mechanism, etc. This point also applies to the expression "the first lens group substantially consisting of a first lens having a negative refractive power, a second lens, a third lens having a negative refractive power, and a fourth lens having a positive refractive power, in this order from the object side" and the expression "the second lens group substantially consisting of four lenses" in connection with a second zoom lens to be described later.

Note that cemented lenses may be employed as the lenses that constitute the zoom lens of the present invention. In the case that cemented lenses are employed, they will be counted as n lenses if they are constituted by n lenses cemented together. In addition, the expressions "zoom lens of the present invention" and "zoom lens according to the present invention" in the present specification refer to the first zoom lens of the present invention and the a second zoom lens of the present invention to be described later, unless particularly noted.

The surface shapes and the signs of refractive powers of the lenses of the zoom lens of the present invention will be those in the paraxial regions for lenses that include aspherical surfaces.

Note that in the first zoom lens according to the present invention, it is desirable for at least one of the following conditional formulae:

$$-0.01 < fw/f_{G12} < 0.20 \quad (1\text{-}2)$$

$$-0.15 < f_1/f_{G12} < 0.30 \quad (2\text{-}2)$$

to be satisfied within the ranges defined by Conditional Formulae (1-1) and (2-1).

Further, it is particularly desirable for at least one of the following conditional formulae:

$$-0.01 < fw/f_{G12} < 0.06 \quad (1\text{-}3)$$

$$-0.15 < f_1/f_{G12} < 0.05 \quad (2\text{-}3)$$

to be satisfied within the ranges defined by Conditional Formulae (1-1) and (2-1).

A second zoom lens of the present invention substantially consists of:
  a first lens group having a negative refractive power; and
  a second lens group having a positive refractive power, provided in this order from an object side;
  the first lens group and the second lens group being moved to change magnification;
  the first lens group substantially consisting of a first lens having a negative refractive power, a second lens, a third lens having a negative refractive power, and a fourth lens having a positive refractive power, in this order from the object side;
  the second lens group substantially consisting of four lenses; and
  the zoom lens satisfying the following conditional formulae:

$$-0.50 < fw/f_{G12} < 0.17 \quad (1\text{-}4)$$

$$-1.00 < f_1/f_{G12} < 0.16 \quad (2\text{-}4)$$

wherein $f_{G12}$ is the focal length of the second lens from the object side within the first lens group, fw is the focal length of the entire system at a wide angle end, and $f_1$ is the focal length of the first lens group.

In the second zoom lens according to the present invention, it is desirable for at least one of the following conditional formulae:

$$-0.20 < fw/f_{G12} < 0.10 \quad (1\text{-}5)$$

$$-0.50 < f_1/f_{G12} < 0.05 \quad (2\text{-}5)$$

to be satisfied within the ranges defined by Conditional Formulae (1-4) and (2-4).

Further, it is particularly desirable for at least one of the following conditional formulae:

$$-0.01 < fw/f_{G12} < 0.06 \quad (1\text{-}3)$$

$$-0.15 < f_1/f_{G12} < 0.05 \quad (2\text{-}3)$$

to be satisfied within the ranges defined by Conditional Formulae (1-4) and (2-4).

Meanwhile, an imaging apparatus according to the present invention is equipped with one of the zoom lenses of the present invention.

In the first zoom lens according to the present invention, the first lens group is constituted by four lenses, which are the first lens having a negative refractive power, the second lens, the third lens having a negative refractive power, and the fourth lens having a positive refractive power, provided in this order from the object side. Thereby, suppressing increases of aberrations that accompany widening of an angle of view becomes possible while suppressing increases in cost.

In addition, the first zoom lens according to the present invention exhibits the following advantageous effects by satisfying Conditional Formula (1-1). Conditional Formula (1-1) determines the relationship between the focal length of the entire system at the wide angle end and the focal length of the second lens within the first lens group. If the value of $fw/f_{G12}$ is less than or equal to the lower limit defined in Conditional Formula (1-1), the refractive power of the second lens will move to the negative side, and refraction of central light beams and refraction of peripheral light beams that pass through the second lens will become imbalanced. As a result, correction of distortion will become difficult, which is not favorable. Inversely, if the value of $fw/f_{G12}$ is greater than or equal to the upper limit defined in Conditional Formula (1-1), the positive refractive power of the second lens will become excessively strong, and the negative refractive power of the first lens group as a whole will become insufficient. This will lead to difficulties in widening the angle of view. Increasing the refractive powers of the negative lenses within the first lens group may be considered in order to compensate for the insufficient negative refractive power of the first lens group as a whole. However, such an approach will lead to difficulties in correcting various aberrations, which is not favorable. The above shortcomings can be prevented in the case that Conditional Formula (1-1) is satisfied. That is, distortion can be favorably corrected, and the angle of view can be easily widened.

The above advantageous effects will become more prominent particularly in the case that Conditional Formula (1-2) is satisfied, and further in the case that Conditional Formula (1-3) is satisfied within the range defined in Conditional Formula (1-1).

Further, the first zoom lens of the present invention exhibits the following advantageous effects by satisfying Conditional Formula (2-1). Conditional Formula (2-1) determines the relationship between the focal length of the first lens group and the focal length of the second lens within the first lens group. If the value of $f_1/f_{G12}$ is less than or equal to the lower limit defined in Conditional Formula (2-1), the positive refractive power of the second lens will become strong, and the negative refractive power of the first lens group will become great in order to compensate for the increased refractive power of the second lens. This will result in correction of various aberrations becoming difficult, which is not preferable. Inversely, if the value of $f_1/f_{G12}$ is greater than or equal to the upper limit defined in Conditional Formula (2-1), the negative refractive power of the second lens will be excessively strong. This will result in correction of distortion becoming difficult, which is not favorable. The above shortcomings can be prevented in the case that Conditional Formula (2-1) is satisfied. That is, distortion and other various aberrations can be favorably corrected.

The above advantageous effects will become more prominent in the case that Conditional Formula (2-2) is satisfied, and further in the case that Conditional Formula (2-3) is satisfied within the range defined in Conditional Formula (2-1).

In the second zoom lens according to the present invention, the first lens group is constituted by four lenses, which are the first lens having a negative refractive power, the second lens, the third lens having a negative refractive power, and the fourth lens having a positive refractive power, provided in this order from the object side. Thereby, suppressing increases of aberrations that accompany widening of an angle of view becomes possible while suppressing increases in cost. Further, the second lens group of the second zoom lens according to the present invention is also constituted by four lenses.

Thereby, suppressing variations of aberrations due to changes in magnification becomes possible, while suppressing increases in cost.

In addition, the second zoom lens according to the present invention exhibits the following advantageous effects by satisfying Conditional Formula (1-4). Conditional Formula (1-4) determines the relationship between the focal length of the entire system at the wide angle end and the focal length of the second lens within the first lens group similarly to Conditional Formula (1-1). If the value of $fw/f_{G12}$ is less than or equal to the lower limit defined in Conditional Formula (1-4), the refractive power of the second lens will move to the negative side, and refraction of central light beams and refraction of peripheral light beams that pass through the second lens will become imbalanced. As a result, correction of distortion will become difficult, which is not favorable. Inversely, if the value of $fw/f_{G12}$ is greater than or equal to the upper limit defined in Conditional Formula (1-4), the positive refractive power of the second lens will become excessively strong, and the negative refractive power of the first lens group as a whole will become insufficient. This will lead to difficulties in widening the angle of view. Increasing the refractive powers of the negative lenses within the first lens group may be considered in order to compensate for the insufficient negative refractive power of the first lens group as a whole. However, such an approach will lead to difficulties in correcting various aberrations, which is not favorable. The above shortcomings can be prevented in the case that Conditional Formula (1-4) is satisfied. That is, distortion can be favorably corrected, and the angle of view can be easily widened.

The above advantageous effects will become more prominent particularly in the case that Conditional Formula (1-5) is satisfied, and further in the case that Conditional Formula (1-3) is satisfied within the range defined in Conditional Formula (1-4).

Further, the second zoom lens according to the present invention exhibits the following advantageous effects by satisfying Conditional Formula (2-4). Conditional Formula (2-4) determines the relationship between the focal length of the first lens group and the focal length of the second lens within the first lens group, similarly to Conditional Formula (2-1). If the value of $f_1/f_{G12}$ is less than or equal to the lower limit defined in Conditional Formula (2-4), the positive refractive power of the second lens will become strong, and the negative refractive power of the first lens group will become great in order to compensate for the increased refractive power of the second lens. This will result in correction of various aberrations becoming difficult, which is not preferable. Inversely, if the value of $f_1/f_{G12}$ is greater than or equal to the upper limit defined in Conditional Formula (2-4), the negative refractive power of the second lens will be excessively strong. This will result in correction of distortion becoming difficult, which is not favorable. The above shortcomings can be prevented in the case that Conditional Formula (2-4) is satisfied. That is, distortion and other various aberrations can be favorably corrected.

The above advantageous effects will become more prominent in the case that Conditional Formula (2-5) is satisfied, and further in the case that Conditional Formula (2-3) is satisfied within the range defined in Conditional Formula (2-4).

The zoom lens of the present invention has sufficiently low F values as will be indicated by the Examples of numerical values to be described later.

Meanwhile, the imaging apparatus according to the present invention is equipped with the zoom lens of the present invention that exhibits the advantageous effects described above. Therefore, the imaging apparatus of the present invention can achieve cost reduction and a wide angle of view, while maintaining favorable optical performance.

BEST MODE FOR CARRYING OUT THE INVENTION

Figure 1:
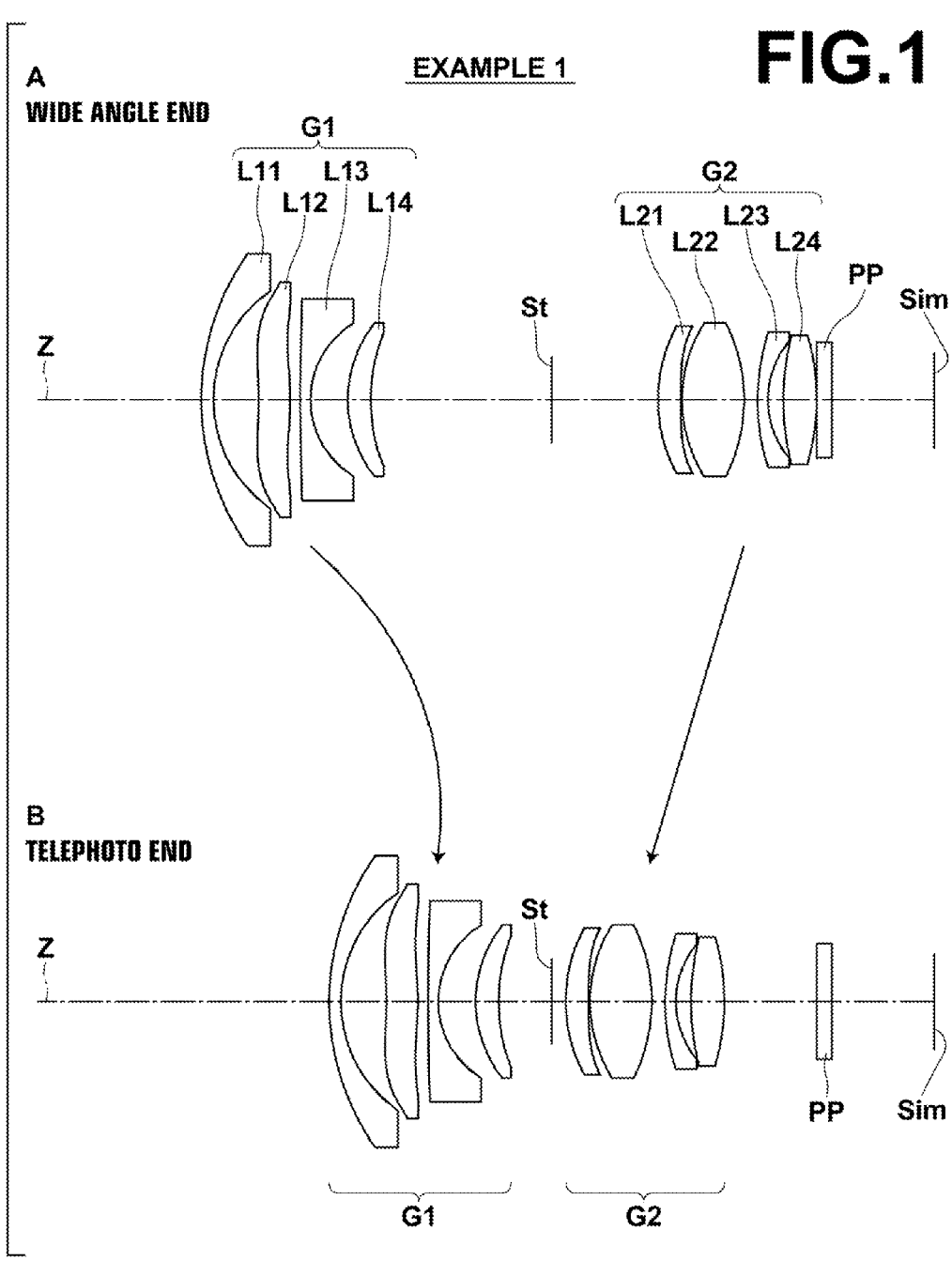
FIG. 1 is a cross sectional diagram that illustrates the lens configuration of a zoom lens according to a first embodiment of the present invention.
Figure 2:
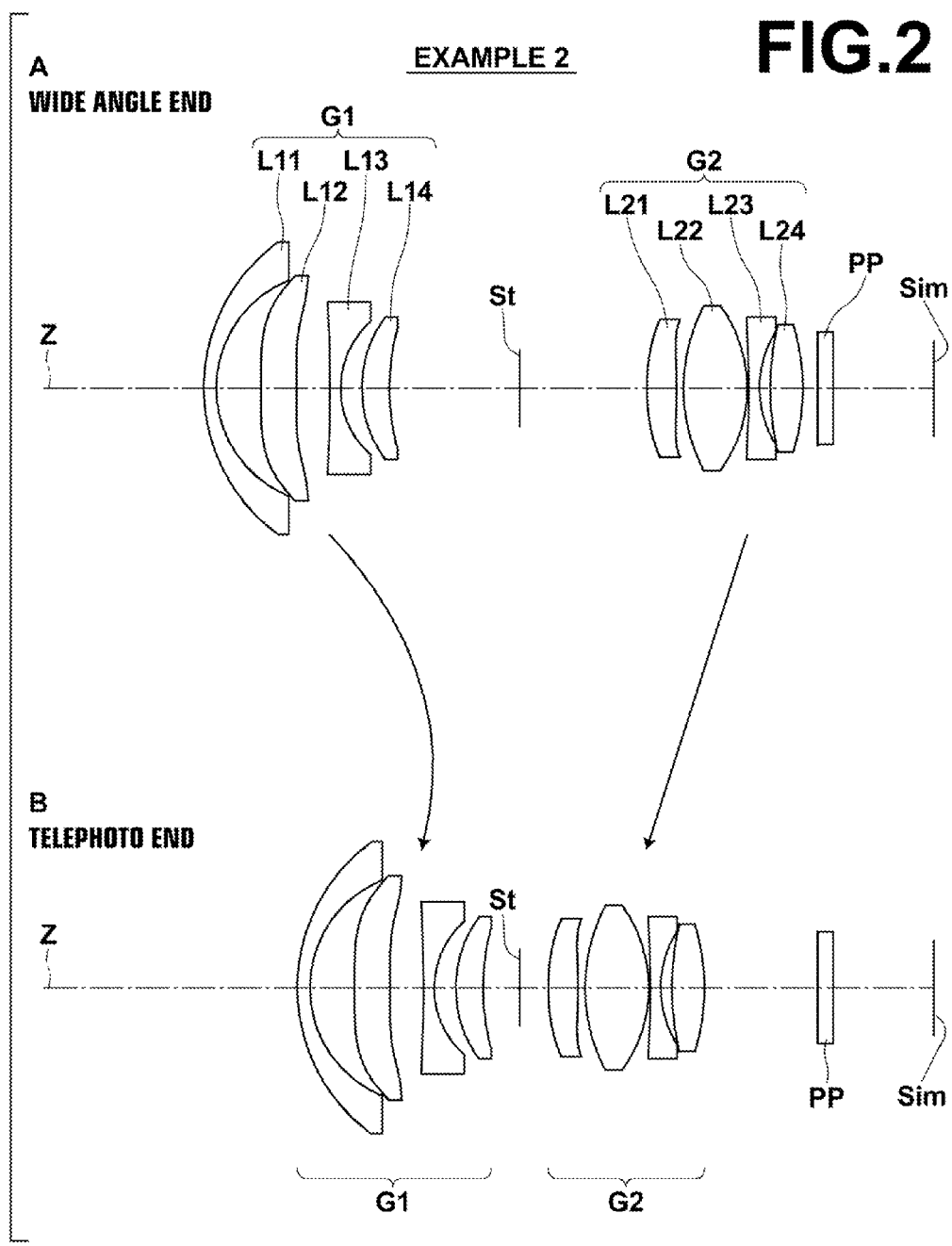
FIG. 2 is a cross sectional diagram that illustrates the lens configuration of a zoom lens according to a second embodiment of the present invention.
Figure 3:
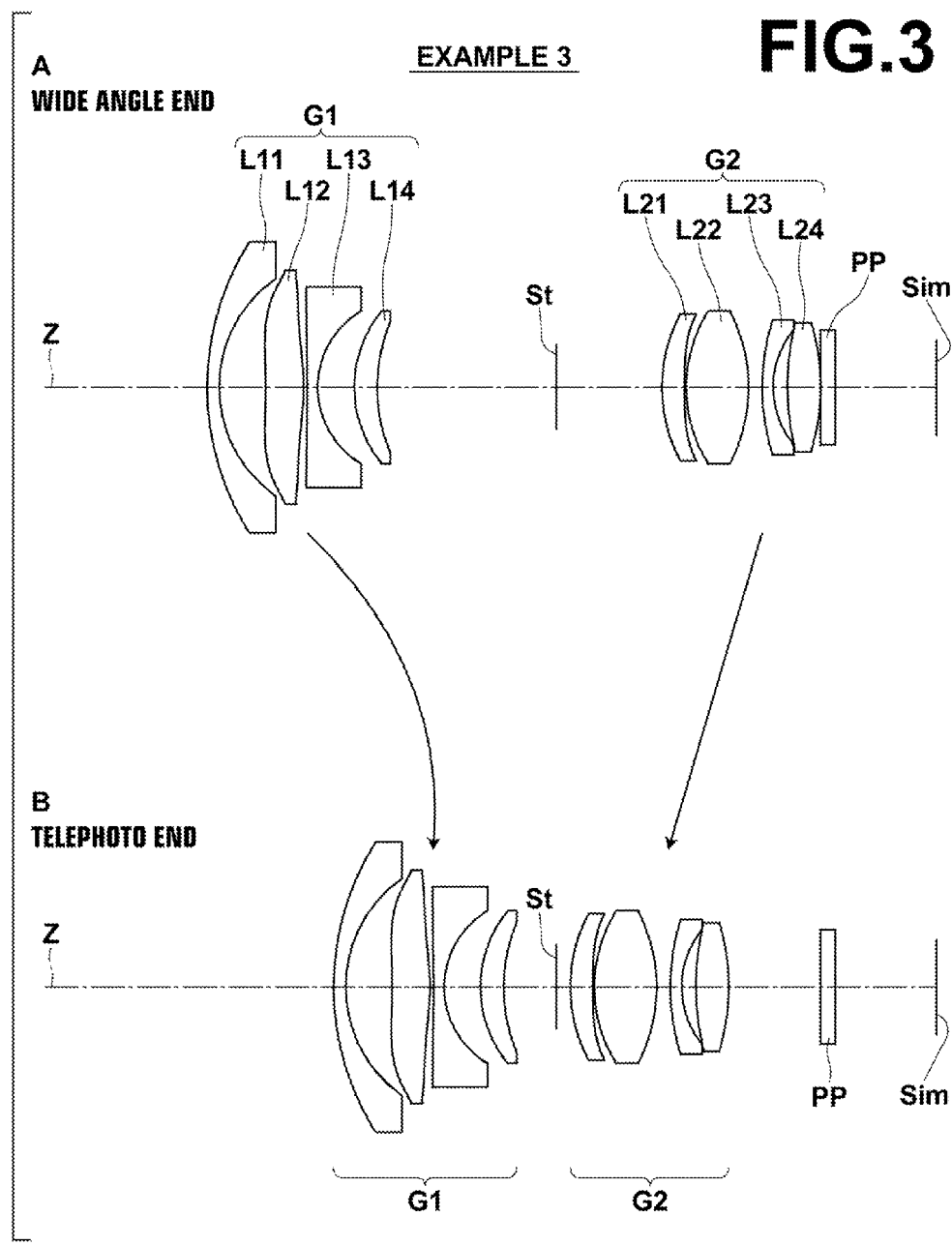
FIG. 3 is a cross sectional diagram that illustrates the lens configuration of a zoom lens according to a third embodiment of the present invention.
Figure 4:
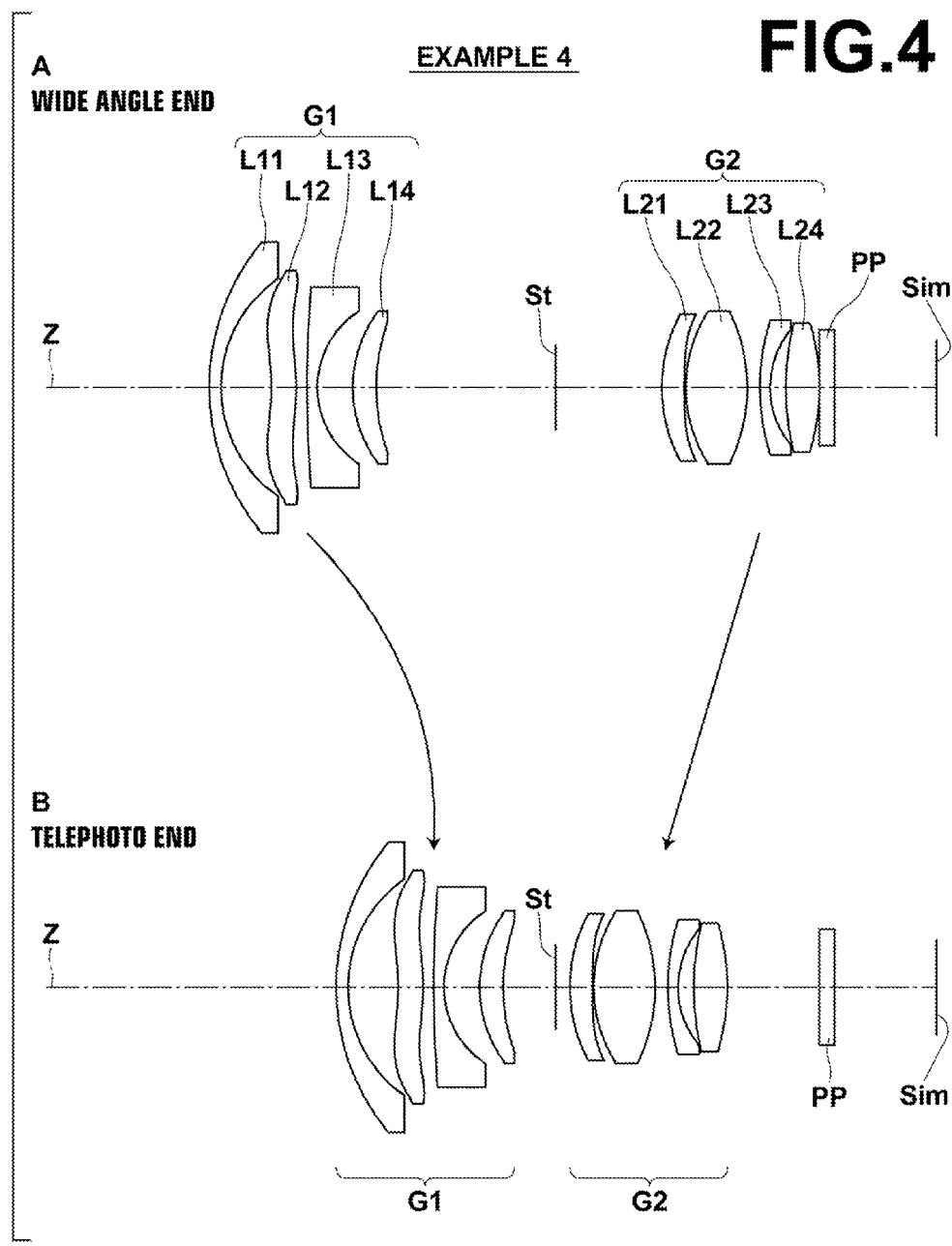
FIG. 4 is a cross sectional diagram that illustrates the lens configuration of a zoom lens according to a fourth embodiment of the present invention.
Figure 5:
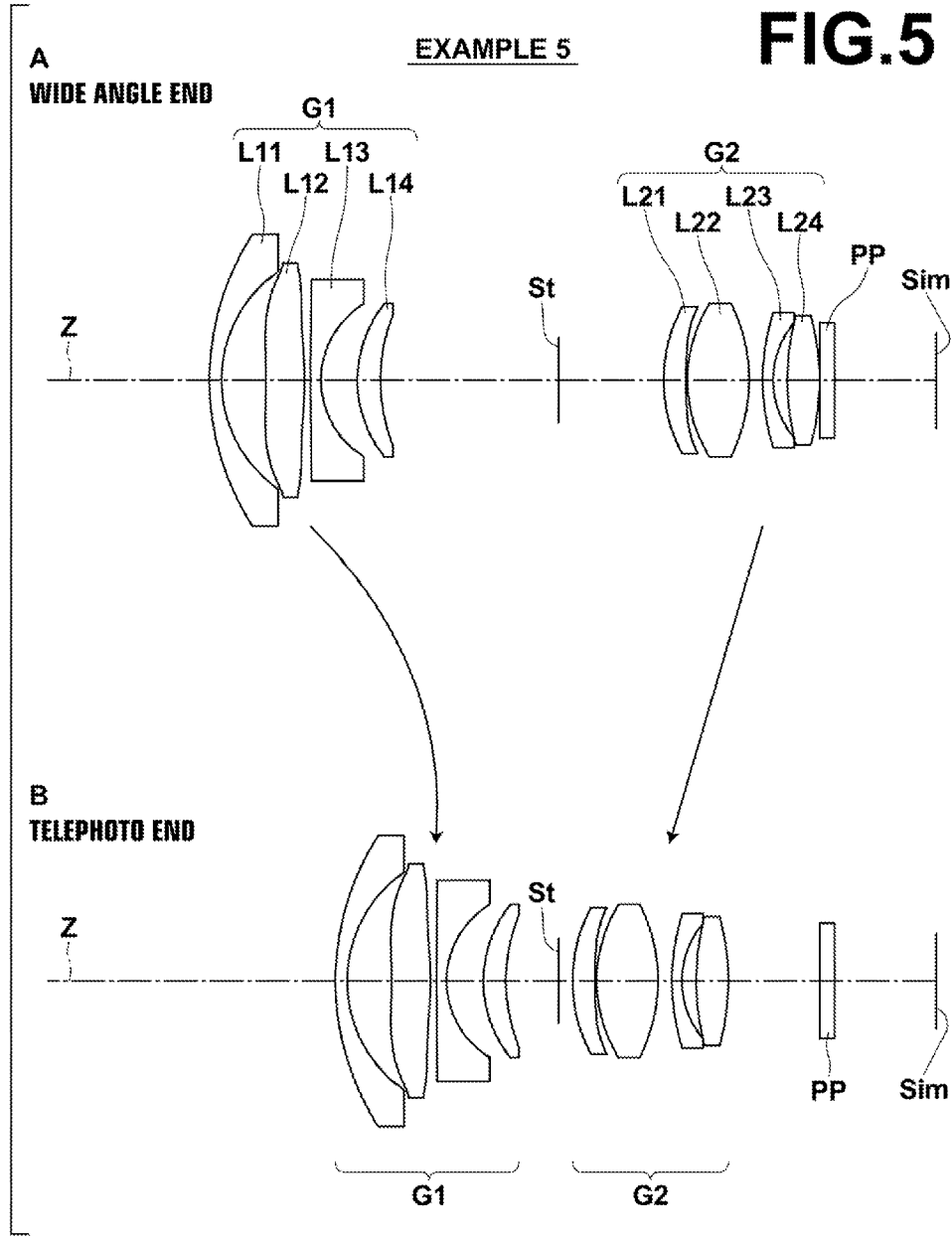
FIG. 5 is a cross sectional diagram that illustrates the lens configuration of a zoom lens according to a fifth embodiment of the present invention.
Figure 6:
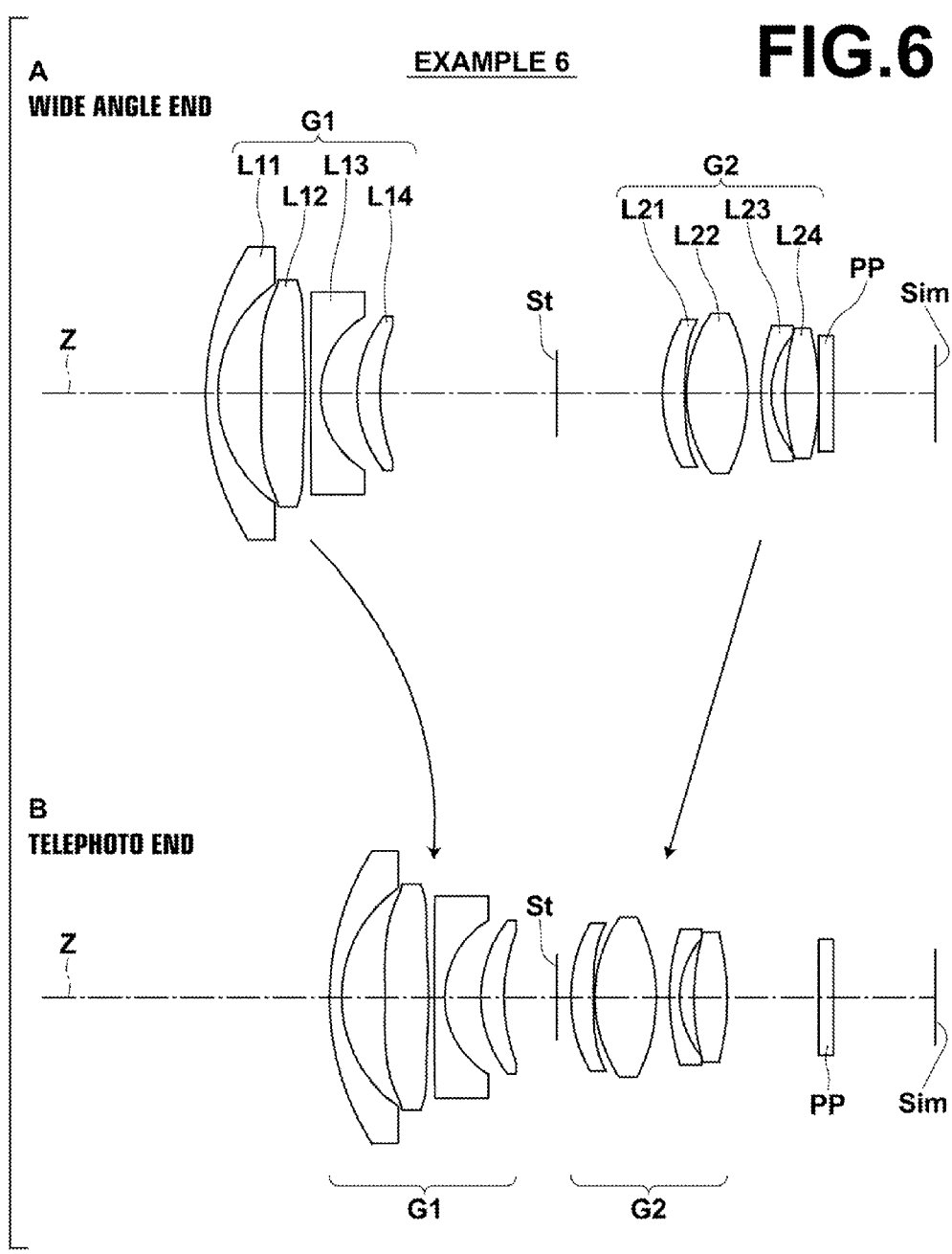
FIG. 6 is a cross sectional diagram that illustrates the lens configuration of a zoom lens according to a sixth embodiment of the present invention.

Hereinafter, embodiments of the present invention will be described in detail with reference to the attached drawings. FIG. 1 is a cross sectional diagram that illustrates the configuration of a zoom lens according to an embodiment of the present invention, and corresponds to a zoom lens of Example 1 to be described later. FIG. 2 through FIG. 6 are cross sectional diagrams that illustrate configurations of zoom lenses according to other embodiments of the present invention, and corresponds to zoom lenses of Examples 2 through 6 to be described later. The basic configurations of the embodiments illustrated in FIG. 1 through FIG. 6 are the same except for points that will be specifically noted. The manners in which the configurations are illustrated are also the same. Therefore, the zoom lenses according to the embodiments of the present invention will be described mainly with reference to FIG. 1.

In FIG. 1, the left side is the object side and the right side is the image side. A of FIG. 1 illustrates the arrangement of the optical system in a state focused on infinity at a wide angle end (shortest focal length state). B of FIG. 1 illustrates the arrangement of the optical system in a state focused on infinity at a telephoto end (longest focal length state). The same applies to FIGS. 2 through 6 to be described later.

Each of the zoom lenses according to the embodiments of the present invention has a first lens group G1 having a negative refractive power and a second lens group G2 having a positive refractive power, in this order from the object side. A fixed aperture stop St that does not move when changing magnification is provided between the first lens group G1 and the second lens group G2. The aperture stop St illustrated in the drawings does not necessarily represent the size or shape thereof, but only the position thereof on an optical axis Z.

Note that FIG. 1 illustrates an example in which a parallel plate optical member PP is provided between the second lens group G2 and an imaging surface Sim. When the zoom lens is applied to an imaging apparatus, it is preferable for various filters, such as a cover glass, an infrared ray cutoff filter, and a low pass filter, to be provided between the optical system and the imaging surface Sim, according to the configuration of a camera on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In this case, a color separating optical system may be provided at the position of the optical member PP.

This zoom lens is configured such that the distance between the first lens group G1 and the second lens group G2 changes when changing magnification. More specifically, the first lens group G1 moves toward the imaging surface Sim along a convex trajectory, and the second lens group G2 moves monotonously toward the object side when changing magnification from the wide angle end to the telephoto end. FIG. 1 schematically illustrates the movement trajectories of the first lens group G1 and the second lens group G2 when changing magnification from the wide angle end to the telephoto end with the arrows indicated between A and B.

The first lens group G1 is constituted by a first lens L11 having a negative refractive power, a second lens L12 having a positive refractive power, a third lens L13 having a negative refractive power, and a fourth lens L14 having a positive refractive power, provided in this order from the object side. Here, the first lens L11 may be a negative meniscus shaped lens, the second lens L12 may be a lens having an aspherical surface toward the object side and an aspherical surface toward the image side, the third lens L13 may be a negative meniscus shaped lens, and the fourth lens L14 may be a positive meniscus shaped lens, as illustrated in the example illustrated in FIG. 1. Note that the fourth embodiment employs a lens having a negative refractive power as the second lens L12.

The surface of the second lens L12 toward the object side is of an aspherical shape which is concave toward the object side in a paraxial region. In addition, at least one of the surface of the second lens L12 toward the object side and the surface of the second lens L12 toward the image side is of an aspherical shape with at least one inflection point within a range from the center to the effective diameter thereof (both surfaces in the example of FIG. 1). Note that particularly in the second embodiment, the surface of the second lens L12 toward the object side is convex toward the object side in the paraxial region and is of an aspherical shape that does not have any inflection points within a range from the center to the effective diameter thereof.

Meanwhile, the second lens group G2 is constituted by a first lens L21 having a positive refractive power, a second lens L22 having a positive refractive power, a third lens L23 having a negative refractive power, and a fourth lens L24 having a positive refractive power, provided in this order from the object side. Here, the first lens L21 may be a lens having an aspherical surface toward the object side and an aspherical surface toward the image side, the second lens L22 may be a biconvex shaped lens, the third lens L23 may be a negative meniscus shaped lens, and the fourth lens L24 may be a biconvex shaped lens, as in the example illustrated in FIG. 1.

As described above, in the present zoom lens, the first lens group G1 is constituted by four lenses, which are the first lens L11 having a negative refractive power, the second lens L12, the third lens L13 having a negative refractive power, and the fourth lens L14 having a positive refractive power, provided in this order from the object side. Thereby, increases of aberrations that accompany widening of an angle of view are suppressed while suppressing increases in cost. In addition, distortion is favorably corrected because the second lens L12 is a lens having a positive refractive power in the embodiments other than the fourth embodiment.

In addition, distortion is favorably corrected because the second lens L12 within the first lens group G1 has an aspherical surface toward the object side. Costs can be reduced more than a case in which the first lens L11 has an aspherical surface. That is, generally, positions at which on axis light rays pass through and off axis light rays pass through become greatly separated in front of and behind the first lens L11. Therefore, it is desirable for the first lens L11 or the second lens L12 to be an aspherical lens in order to favorably correct distortion. However, because the first lens L11 generally has a comparatively large diameter, the cost of the aspherical lens will be decreased by the second lens L12, which generally has a smaller diameter, being an aspherical lens. As a result, the cost of the zoom lens can be suppressed.

Spherical aberration and distortion are favorably corrected, because the surface of the second lens L12 toward the object side is an aspherical surface which is concave toward the object side at the paraxial region in the embodiments other than the second embodiment.

Further, distortion and field curvature at the wide angle end can be favorably corrected, because at least one of the surface of the second lens L12 toward the object side and the surface of the second lens L12 toward the image side is of an aspherical shape with at least one inflection point within a range from the center to the effective diameter thereof in the embodiments other than the second embodiment.

Meanwhile, variation of aberrations due to changes in magnification can be suppressed while suppressing increases in cost, by the second lens group G2 being constituted by four lenses.

In the present zoom lens, the second lens group G2 is constituted by the first lens L21 having a positive refractive power, the second lens L22 having a positive refractive power, the third lens L23 having a negative refractive power, and the fourth lens L24 having a positive refractive power, provided in this order from the object side. Thereby, variations of aberrations accompanying changes in magnification are suppressed. That is, on axis light rays which are greatly dispersed when output from the first lens group G1 can be taken in by the two positive lenses L21 and L22 having positive refractive powers if the first lens L21 and the second lens L22 within the second lens group G2 are positive lenses. Thereby, higher order spherical aberration is suppressed, and variations in aberrations accompanying changes in magnification are suppressed.

The first lens group G1 of the present zoom lens is constituted by the first lens L11 having a negative refractive power, the second lens L12, the third lens L13 having a negative refractive power, and the fourth lens L14 having a positive refractive power. The present zoom lens satisfies both of the following conditional formulae:

$$-0.04 < fw/f_{G12} < 0.17 \quad (1\text{-}1)$$

$$-0.19 < f_1/f_{G12} < 0.50 \quad (2\text{-}1)$$

wherein $f_{G12}$ is the focal length of the second lens from the object side within the first lens group, fw is the focal length of the entire system at a wide angle end, and $f_1$ is the focal length of the first lens group.

Note that examples of numerical values of each condition determined by the above Conditional Formulae for each embodiment are shown in Table 19. The values of $fw/f_{G12}$ determined by Conditional Formula (1-1) are shown in the row titled "Conditional Formula 1", and the values of $f_1/f_{G12}$ determined by Conditional Formula (2-1) are shown in the row titled "Conditional Formula (2)" In addition, Table 19 also shows examples of numerical values of each condition determined by Conditional Formulae (3) through (9) to be described later.

Hereinafter, the operations and effects exhibited by the configurations determined by Conditional Formulae (1-1) and (2-1) will be described.

Conditional Formula (1-1) determines the relationship between the focal length of the entire system at the wide angle end and the focal length of the second lens L12 within the first lens group G1. If the value of $fw/f_{G12}$ is less than or equal to the lower limit defined in Conditional Formula (1-1), the refractive power of the second lens L12 will move to the negative side, and refraction of central light beams and refraction of peripheral light beams that pass through the second lens L12 will become imbalanced. As a result, correction of distortion will become difficult, which is not favorable. Inversely, if the value of $fw/f_{G12}$ is greater than or equal to the upper limit defined in Conditional Formula (1-1), the positive refractive power of the second lens L12 will become excessively strong, and the negative refractive power of the first lens group G1 as a whole will become insufficient. This will lead to difficulties in widening the angle of view. Increasing the refractive powers of the negative lenses within the first lens group G1, that is, the first lens L11 and the third lens L13, may be considered in order to compensate for the insufficient negative refractive power of the first lens group G1 as a whole. However, such an approach will lead to difficulties in correcting various aberrations, which is not favorable. The above shortcomings are prevented because the present zoom lens satisfies Conditional Formula (1-1). That is, distortion can be favorably corrected, and the angle of view can be easily widened.

The present zoom lens satisfies Conditional Formula (1-2) within the range defined in Conditional Formula (1-1).

$$-0.01 < fw/f_{G12} < 0.20 \quad (1\text{-}2)$$

Therefore, the above advantageous effects are more prominent. Further, the present zoom lens satisfies Conditional Formula (1-3) within the range defined in Conditional Formula (1-1).

$$-0.01 < fw/f_{G12} < 0.06 \quad (1\text{-}3)$$

Therefore, the advantageous effects are even more prominent.

Further, the present zoom lens exhibits the following advantageous effects by satisfying Conditional Formula (2-1). Conditional Formula (2-1) determines the relationship between the focal length of the first lens group G1 and the focal length of the second lens L12 within the first lens group G1. If the value of $f_1/f_{G12}$ is less than or equal to the lower limit defined in Conditional Formula (2-1), the positive refractive power of the second lens L12 will become strong, and the negative refractive power of the first lens group G1 will become great in order to compensate for the increased refractive power of the second lens. This will result in correction of various aberrations becoming difficult, which is not preferable. Inversely, if the value of $f_1/f_{G12}$ is greater than or equal to the upper limit defined in Conditional Formula (2-1), the negative refractive power of the second lens L12 will be excessively strong. This will result in correction of distortion becoming difficult, which is not favorable. The above shortcomings can be prevented in the case that Conditional Formula (2-1) is satisfied. That is, distortion and other various aberrations can be favorably corrected.

The present zoom lens satisfies Conditional Formula (2-2) within the range defined in Conditional Formula (2-1).

$$-0.15 < f_1/f_{G12} < 0.30 \quad (2\text{-}2)$$

Therefore, the above advantageous effects are more prominent.

In addition, the first lens group G1 of the present zoom lens is constituted by the first lens L11 having a negative refractive power, the second lens L12, the third lens L13 having a negative refractive power, and the fourth lens L14 having a positive refractive power. The present zoom lens satisfies both of the following conditional formulae:

$$-0.50 < fw/f_{G12} < 0.17 \quad (1\text{-}4)$$

$$-1.00 < f_1/f_{G12} < 0.16 \quad (2\text{-}4).$$

Conditional Formula (1-4) determines the relationship between the focal length of the entire system at the wide angle end and the focal length of the second lens L12 within the first lens group G1 similarly to Conditional Formula (1-1). If the value of $fw/f_{G12}$ is less than or equal to the lower limit defined in Conditional Formula (1-4), the refractive power of the second lens L12 will move to the negative side, and refraction of central light beams and refraction of peripheral light beams that pass through the second lens L12 will become imbalanced. As a result, correction of distortion will become difficult, which is not favorable. Inversely, if the value of $fw/f_{G12}$ is greater than or equal to the upper limit defined in Conditional Formula (1-4), the positive refractive power of the second lens L12 will become excessively strong, and the negative refractive power of the first lens group as a whole will become insufficient. This will lead to difficulties in widening the angle of view. The above shortcomings are prevented because the present zoom lens satisfies Conditional Formula (1-4). That is, distortion can be favorably corrected, and the angle of view can be easily widened.

The present zoom lens satisfies Conditional Formula (1-5) within the range defined in Conditional Formula (1-4).

$$-0.20 < fw/f_{G12} < 0.10 \quad (1\text{-}5)$$

Therefore, the above advantageous effects are more prominent. Further, the present zoom lens satisfies Conditional Formula (1-3) within the range defined in Conditional Formula (1-4).

$$-0.01 < fw/f_{G12} < 0.06 \quad (1\text{-}3)$$

Therefore, the above advantageous effects are even more prominent.

Further, the present zoom lens exhibits the following advantageous effects by satisfying Conditional Formula (2-1). Conditional Formula (2-4) determines the relationship between the focal length of the first lens group G1 and the focal length of the second lens L12 within the first lens group G1, similarly to Conditional Formula (2-1). If the value of $f_1/f_{G12}$ is less than or equal to the lower limit defined in Conditional Formula (2-4), the positive refractive power of the second lens L12 will become strong, and the negative refractive power of the first lens group G1 will become great in order to compensate for the increased refractive power of the second lens L12. This will result in correction of various aberrations becoming difficult, which is not preferable. Inversely, if the value of $f_1/f_{G12}$ is greater than or equal to the upper limit defined in Conditional Formula (2-4), the negative refractive power of the second lens L12 will be excessively strong. This will result in correction of distortion becoming difficult, which is not favorable. The above shortcomings can be prevented in the case that Conditional Formula (2-4) is satisfied. That is, distortion and other various aberrations can be favorably corrected.

The present zoom lens satisfies Conditional Formula (2-5) within the range defined in Conditional Formula (2-4).

$$-0.50 < f_1/f_{G12} < 0.05 \quad (2\text{-}5)$$

Therefore, the above advantageous effects are more prominent. Further, the present zoom lens satisfies Conditional Formula (2-3) within the range defined in Conditional Formula (2-4).

$$-0.15 < f_1/f_{G12} < 0.05 \quad (2\text{-}3)$$

Therefore, the above advantageous effects are even more prominent.

In addition, the present zoom lens satisfies the following conditional formula:

$$0.31 < fw/f_2 < 0.49 \quad (3)$$

wherein fw is the focal length of the entire system at the wide angle end, and $f_2$ is the focal length of the second lens group G2. Therefore, the present zoom lens exhibits the following advantageous effects. That is, Conditional Formula (3) determines the relationship between the focal length fw of the entire system at the wide angle end, and the focal length $f_2$ of the second lens group G2. If the value of $fw/f_2$ is less than or equal to the lower limit defined in Conditional Formula (3), the refractive power of the second lens group G2 will be weak. As a result, the amount of movement of the second lens group G2 when changing magnification will increase, the total length of the optical system as a whole will become long, and miniaturization will become difficult, which is not preferable. Inversely, if the value of $fw/f_2$ is greater than or equal to the upper limit defined in Conditional Formula (3), the refractive power of the second lens group G2 will be excessively strong. As a result, it will become difficult to favorably correct various aberrations across the entire range of magnifications, which is not preferable. The foregoing shortcomings can be prevented in the case that Conditional Formula (3) is satisfied. That is, miniaturization of the optical system as a whole can be achieved and various aberrations can be favorably corrected across the entire range of magnifications.

Note that the above advantageous effects will become more prominent if the following conditional formula is satisfied within the range defined by Conditional Formula (3)

$$0.31 < fw/f_2 < 0.35 \quad (3').$$

In addition, the present zoom lens satisfies the following conditional formula:

$$0.56 < |f_1/f_2| < 1.04 \quad (4)$$

wherein $f_1$ is the focal length of the first lens group G1, and $f_2$ is the focal length of the second lens group G2. Therefore, the present zoom lens exhibits the following advantageous effects. That is, Conditional Formula (4) determines the relationship between the focal length $f_1$ of the first lens group G1, and the focal length $f_2$ of the second lens group G2. If the value of $|f_1/f_2|$ is less than or equal to the lower limit defined in Conditional Formula (4), the refractive power of the second lens group G2 will be weak. As a result, the amount of movement of the second lens group G2 when changing magnification will increase, the total length of the optical system as a whole will become long, and miniaturization will become difficult, which is not preferable. Inversely, if the value of $|f_1/f_2|$ is greater than or equal to the upper limit defined in Conditional Formula (4), the refractive power of the first lens group G1 will be insufficient. As a result, the necessity to increase the diameter of the first lens L11 positioned most toward the object side will arise in order to secure an angle of view and miniaturization will become difficult, which is not preferable. The foregoing shortcomings can be prevented in the case that Conditional Formula (4) is satisfied. That is, miniaturization of the optical system as a whole can be easily achieved.

Note that the above advantageous effects will become more prominent if the following conditional formula is satisfied within the range defined by Conditional Formula (4)

$$0.70 < |f_1/f_2| < 0.80 \quad (4').$$

In addition, the present zoom lens satisfies the following conditional formula:

$$0.00 < |fw/f_1| < 0.63 \quad (5)$$

wherein fw is the focal length of the entire system at the wide angle end, and $f_1$ is the focal length of the first lens group G1. Therefore, the present zoom lens exhibits the following advantageous effects. That is, Conditional Formula (5) determines the relationship between the focal length of the entire system at the wide angle end and the focal length of the first lens group G1. If the value of $|fw/f_1|$ is greater than or equal to the upper limit defined in Conditional Formula (5), the negative refractive power of the first lens group G1 will be excessively strong. This will result in correction of various aberrations at off axis portions difficult, which is not favorable. The above shortcoming can be prevented in the case that Conditional Formula (5) is satisfied. That is, the various aberrations can be favorably corrected at off axis portions.

The above advantageous effects will become more prominent particularly in the case that Conditional Formula (5') is satisfied within the range defined in Conditional Formula (5).

$$0.20 < |fw/f_1| < 0.50 \quad (5').$$

If the value of $|fw/f_1|$ is less than or equal to the lower limit defined in Conditional Formula (5'), the negative refractive power of the first lens group G1 will become weak. This will result in the optical system as a whole becoming larger, which is not preferable. The above shortcoming can be prevented in the case that Conditional Formula (5') is satisfied. That is, the optical system as a whole can be miniaturized.

In addition, the present zoom lens satisfies the following conditional formula:

$$0.20 < H_{G12F} \cdot \{(1/r'_{G12F}) - (1/r''_{G12F})\} \quad (6)$$

wherein $H_{G12F}$ is maximum effective radius of the surface toward the object side of the second lens from the object side within the first lens group G1, $r'_{G12F}$ is the radius of curvature of a spherical surface that passes through the center of the surface of the second lens toward the object side and a point at a height $H_{G12F}$ from the optical axis and has the center of the surface as its apex, and $r''_{G12F}$ is the radius of curvature of a spherical surface that passes through the center of the surface of the second lens toward the object side and a point at a height $H_{G12F}\cdot 0.5$ from the optical axis and has the center of the surface as its apex. Therefore, the present zoom lens exhibits the following advantageous effects. That is, Conditional Formula (6) determines the relationship between the maximum effective radius and the aspherical surface shape of the surface of the second lens L12 within the first lens group G1 toward the object side. By causing the radii of curvature to be different at the vicinity of the center and at the periphery of the surface of the second lens L12 toward the object side within the range defined in Conditional Formula (6), distortion can be favorably corrected at the wide angle end. If the value of $H_{G12F}\cdot\{(1/r'_{G12F})-(1/r''_{G12F})\}$ is less than or equal to the lower limit defined by Conditional Formula (6), correction will be insufficient. Inversely, if the value of $H_{G12F}\cdot\{(1/r'_{G12F})-(1/r''_{G12F})\}$ is greater than or equal to the upper limit defined in Conditional Formula (6), correction will be excessive, neither of which is preferable.

Note that the above advantageous effect will become more prominent if the following conditional formula is satisfied within the range defined by Conditional Formula (6)

$$0.20 < H_{G12F}\cdot\{(1/r'_{G12F})-(1/r''_{G12F})\} < 0.50 \quad (6')$$

In addition, the present zoom lens satisfies the following conditional formula:

$$2.0 < (r_{G12F}+r_{G12R})/(r_{G12F}-r_{G12R}) < 30.0 \quad (7)$$

wherein $r_{G12F}$ is the paraxial radius of curvature of the surface toward the object side of the second lens from the object side within the first lens group G1, and $r_{G12R}$ is the paraxial radius of curvature of the surface toward the image side of the second lens from the object side within the first lens group G1. Therefore, the present zoom lens exhibits the following advantageous effects. That is, Conditional Formula (7) determines the shape of the second lens L12 within the first lens group G1. If the value of $(r_{G12F}+r_{G12R})(r_{G12F}-r_{G12R})$ is less than or equal to the lower limit defined by Conditional Formula (7), correction of distortion at the wide angle end will be insufficient, which is not preferable. Inversely, if the value of $(r_{G12F}+r_{G12R})/(r_{G12F}-r_{G12R})$ is greater than or equal to the upper limit defined in Conditional Formula (7), correction of spherical aberration at the telephoto end will become difficult, which is not preferable. The foregoing shortcomings can be prevented in the case that Conditional Formula (7) is satisfied. That is, distortion at the wide angle end and spherical aberration at the telephoto end can be favorably corrected.

Note that the above advantageous effects will become more prominent if the following conditional formula is satisfied within the range defined by Conditional Formula (7)

$$2.0 < (r_{G12F}+r_{G12R})/(r_{G12F}-r_{G12R}) < 15.0 \quad (7')$$

In addition, the present zoom lens satisfies the following conditional formula:

$$2.5 < (r_{G11F}+r_{G11R})/(r_{G11F}-r_{G11F}) < 10.0 \quad (8)$$

wherein $r_{G11F}$ is the paraxial radius of curvature of the surface toward the object side of the first lens from the object side within the first lens group G1, and $r_{G11R}$ is the paraxial radius of curvature of the surface toward the image side of the first lens from the object side within the first lens group G1. Therefore, the present zoom lens exhibits the following advantageous effects. That is, Conditional Formula (8) determines the shape of the first lens L11 within the first lens group G1. If the value of $(r_{G11F}+r_{G11R})/(r_{G11F}-r_{G11R})$ is less than or equal to the lower limit defined by Conditional Formula (8), correction of field curvature at the wide angle end will be insufficient, which is not preferable. Inversely, if the value of $(r_{G11F}+r_{G11R})/(r_{G11}-r_{G11R})$ is greater than or equal to the upper limit defined in Conditional Formula (8), correction of field curvature at the wide angle end will become excessive, which is not preferable. The foregoing shortcomings can be prevented in the case that Conditional Formula (8) is satisfied. That is, field curvature at the wide angle end can be appropriately corrected.

Note that the above advantageous effects will become more prominent if the following conditional formula is satisfied within the range defined by Conditional Formula (8)

$$2.8 < (r_{G11F}-r_{G11R})/(r_{G11F}-r_{G11R}) < 4.0 \quad (8')$$

In addition, the present zoom lens satisfies the following conditional formula:

$$1.3 < f_{G21}/f_{G22} < 3.0 \quad (9)$$

wherein $f_{G21}$ is the focal length of the first lens from the object side within the second lens group G2, and $f_{G22}$ is the focal length of the second lens from the object side within the second lens group G2. Therefore, the present zoom lens exhibits the following advantageous effect. That is, Conditional Formula (9) determines the relationship between the focal lengths of the first lens L21 and the second lens L22 within the second lens group G2. If the value of $f_{G21}/f_{G22}$ is less than or equal to the lower limit defined in Conditional Formula (9), correction of spherical aberration will be insufficient, which is not preferable. Inversely, if the value of $f_{G21}/f_{G22}$ is greater than or equal to the upper limit defined in Conditional Formula (9), correction of spherical aberration will be excessive, which is not preferable. The foregoing shortcomings can be prevented in the case that Conditional Formula (9) is satisfied. That is, spherical aberration can be favorably corrected across the entire range of magnifications.

Note that the above advantageous effects will become more prominent if the following conditional formula is satisfied within the range defined by Conditional Formula (9)

$$2.0 < f_{G21}/f_{G22} < 2.5 \quad (9')$$

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Next, examples of the numerical values of the zoom lens of the present invention will be described. The cross sections of the lenses of the zoom lenses of Examples 1 through 6 are those illustrated in FIGS. 1 through 6, respectively.

Regarding the zoom lens of Example 1, basic lens data are shown in Table 1, data related to zoom are shown in Table 2, and aspherical surface data are shown in Table 3. Similarly, basic lens data, data related to zoom, and aspherical surface data of the zoom lenses of Examples 2 through 6 are shown in Table 4 through Table 18. Hereinafter, the meanings of the items in the tables will be described for those related to Example 1. The same basically applies to the tables related to Examples 2 through 6.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, and the distances between an ith surface and an i+1st surface along the optical axis Z are shown in the column Di. Note that the signs of the radii of curvature are positive in cases that the surface shape is convex toward the object side, and negative in cases that the surface shape is convex toward the image side.

In the basic lens data, the refractive indices of jth (j=1, 2, 3, . . . ) optical elements from the object side to the image side with respect to the d line (wavelength: 587.6 nm) are shown in the column Ndj. The Abbe's numbers of the jth optical element with respect to the d line are shown in the column vdj. Note that the aperture stop St is also included in the basic lens data, and the radius of curvature of the surface corresponding to the aperture stop St is shown as "∞(aperture stop)".

D8, D9, and D17 in the basic lens data of Table 1 represents the distances between surfaces that change when changing magnification. D8 is the distance between the first lens group G1 and the aperture stop St. D9 is the distance between the aperture stop St and the second lens group G2. D17 is the distance between the second lens group G2 and the optical member PP.

The data of Table 2 related to zoom shows values of the focal length (f), the F value (Fno.), and the full angle of view (2ω) of the entire system and the distances among surfaces that change at the wide angle end and at the telephoto end.

In the lens data of Table 1, surface numbers of aspherical surfaces are denoted with the mark "*", and paraxial radii of curvature are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients KA and Ram (m=3, 4, 5, . . . , 12) in the aspherical surface formula below:

$$Zd = C \cdot h^2 / \{1 + (1 - KA \cdot C^2 \cdot h^2)^{1/2}\} + \Sigma RAm \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Ram are aspherical surface coefficients (m=3, 4, 5, . . . , 16).

The tables below show numerical values which are rounded off at a predetermined number of digits. In addition, degrees are used as the units for angles and mm are used as the units for lengths in the data of the tables below. However, it is possible for optical systems to be proportionately enlarged or proportionately reduced and utilized. Therefore, other appropriate units may be used.

TABLE 1

Example 1: Basic Lens Data

| Si Surface Number | Ri Radius of Curvature | Di Distance | Ndj Refractive Index | vdj Abbe's Number |
|---|---|---|---|---|
| 1 | 16.7910 | 0.80 | 1.78590 | 44.2 |
| 2 | 8.7843 | 3.04 | | |
| *3 | −22.1777 | 2.10 | 1.53389 | 56.0 |
| *4 | −18.3950 | 0.67 | | |
| 5 | 158.3861 | 0.70 | 1.78590 | 44.2 |
| 6 | 5.9611 | 2.50 | | |
| 7 | 8.1910 | 1.53 | 1.92286 | 18.9 |
| 8 | 11.8859 | D8 | | |
| 9 | ∞Aperture stop | D9 | | |

TABLE 1-continued

Example 1: Basic Lens Data

| Si Surface Number | Ri Radius of Curvature | Di Distance | Ndj Refractive Index | vdj Abbe's Number |
|---|---|---|---|---|
| *10 | 11.4416 | 1.50 | 1.53389 | 56.0 |
| *11 | 58.5954 | 0.10 | | |
| 12 | 9.4968 | 4.15 | 1.49700 | 81.5 |
| 13 | −11.2458 | 0.90 | | |
| 14 | 14.6399 | 0.70 | 1.92286 | 20.9 |
| 15 | 6.0474 | 1.02 | | |
| 16 | 17.2969 | 2.25 | 1.51742 | 52.4 |
| 17 | −15.0096 | D17 | | |
| 18 | ∞ | 1.01 | 1.51633 | 64.1 |
| 19 | ∞ | 6.84 | | |

*Aspherical Surface

TABLE 2

Example 1: Data Related to Zoom

| Item | Wide Angle End | Telephoto End |
|---|---|---|
| f | 3.18 | 7.95 |
| Fno. | 1.85 | 3.10 |
| 2ω | 93.39 | 43.28 |
| D8 | 12.10 | 3.55 |
| D9 | 7.13 | 0.96 |
| D17 | 0.00 | 6.17 |

TABLE 3

Example 1: Aspherical Surface Data

| Surface Number | S3 | S4 |
|---|---|---|
| KA | 1.00000000E+00 | 1.00000000E+00 |
| RA3 | 3.92552657E−04 | −1.78198417E−03 |
| RA4 | 1.63491671E−03 | 2.96047622E−03 |
| RA5 | −5.98243470E−05 | −3.54470466E−04 |
| RA6 | −3.12580573E−05 | −2.14656523E−05 |
| RA7 | 3.08631891E−06 | 3.49680699E−06 |
| RA8 | 2.06084921E−07 | 5.77269401E−07 |
| RA9 | −3.30656971E−08 | 1.80867183E−08 |
| RA10 | 7.50984913E−10 | −1.28540306E−08 |
| RA11 | 4.80884982E−10 | −1.51109077E−09 |
| RA12 | −6.15184533E−11 | 2.22386867E−10 |

| Surface Number | S10 | S11 |
|---|---|---|
| KA | 1.00000000E+00 | 1.00000000E+00 |
| RA3 | 1.88211972E−03 | 1.76860217E−03 |
| RA4 | −1.21236781E−03 | −2.69165382E−04 |
| RA5 | 6.04426291E−04 | 3.95866507E−04 |
| RA6 | −8.55374397E−05 | −2.23064469E−05 |
| RA7 | −4.99070718E−06 | −9.52288260E−06 |
| RA8 | 6.90562953E−07 | 1.17774794E−06 |
| RA9 | 1.79754879E−07 | −6.42044665E−08 |
| RA10 | 4.73691904E−09 | 6.39130198E−09 |
| RA11 | −4.62119417E−10 | 3.66073819E−09 |
| RA12 | −2.98496187E−11 | 5.76274981E−11 |
| RA13 | 3.48467387E−11 | −1.74712784E−11 |
| RA14 | −1.45151464E−11 | 3.01771364E−11 |
| RA15 | −3.10163706E−12 | −4.20522148E−13 |
| RA16 | 3.84723135E−13 | −7.01830246E−13 |

TABLE 4

Example 2: Basic Lens Data

| Si Surface Number | Ri Radius of Curvature | Di Distance | Ndj Refractive Index | vdj Abbe's Number |
|---|---|---|---|---|
| 1 | 12.0000 | 0.85 | 1.83481 | 42.7 |
| 2 | 7.7547 | 3.00 | | |
| *3 | 333.8853 | 2.40 | 1.53389 | 56.0 |
| *4 | −188.2116 | 2.26 | | |
| 5 | −111.2925 | 0.70 | 1.88300 | 40.8 |
| 6 | 5.9612 | 1.45 | | |
| 7 | 7.9606 | 1.85 | 1.92286 | 18.9 |
| 8 | 15.3951 | D8 | | |
| 9 | ∞ Aperture Stop | D9 | | |
| *10 | 14.8790 | 2.00 | 1.53389 | 56.0 |
| *11 | −27.1649 | 0.47 | | |
| 12 | 11.7962 | 4.30 | 1.61800 | 63.3 |
| 13 | −9.3009 | 0.10 | | |
| 14 | −72.9131 | 0.70 | 1.84666 | 23.8 |
| 15 | 7.0342 | 0.75 | | |
| 16 | 18.7928 | 2.20 | 1.58144 | 40.8 |
| 17 | −14.1574 | D17 | | |
| 18 | ∞ | 1.01 | 1.51633 | 64.1 |
| 19 | ∞ | 6.82 | | |

*Aspherical Surface

TABLE 5

Example 2: Data Related to Zoom

| Item | Wide Angle End | Telephoto End |
|---|---|---|
| f | 3.36 | 8.39 |
| Fno. | 1.82 | 3.18 |
| 2ω | 90.62 | 41.16 |
| D8 | 8.77 | 2.45 |
| D9 | 8.58 | 1.94 |
| D17 | 1.00 | 7.64 |

TABLE 6

Example 2: Aspherical Surface Data

| | Surface Number | |
|---|---|---|
| | S3 | S4 |
| KA | 1.00000000E+00 | 1.00000000E+00 |
| RA3 | −1.84518151E−04 | −1.34452536E−03 |
| RA4 | 9.11020231E−04 | 1.50433453E−03 |
| RA5 | 4.36869407E−05 | −1.88326554E−05 |
| RA6 | −9.99470488E−06 | −1.02662481E−05 |
| RA7 | −4.77789164E−07 | −1.12222737E−06 |
| RA8 | 3.77729589E−08 | −8.06437604E−08 |
| RA9 | 7.69951469E−09 | 1.03269414E−09 |
| RA10 | 1.57751409E−09 | 1.07327708E−09 |
| RA11 | −1.53152663E−10 | 1.29361362E−10 |
| RA12 | −1.25879264E−11 | 3.43709353E−12 |

| | Surface Number | |
|---|---|---|
| | S10 | S11 |
| KA | 1.86689146E+00 | −2.34761165E+00 |
| RA3 | 6.38886087E−04 | 8.63959607E−04 |
| RA4 | −1.72624605E−04 | 4.82943361E−04 |
| RA5 | 1.56425637E−04 | 1.17579182E−04 |
| RA6 | −1.72640984E−05 | 1.95121845E−05 |
| RA7 | −1.15229550E−06 | −7.32560718E−06 |
| RA8 | 4.72324927E−08 | 1.36463243E−06 |
| RA9 | 6.56977631E−08 | −6.02693745E−08 |
| RA10 | −6.88442793E−09 | −3.61578440E−10 |
| RA11 | −2.38022413E−10 | −1.02638686E−10 |
| RA12 | −3.22383884E−11 | −6.75284248E−12 |

TABLE 6-continued

Example 2: Aspherical Surface Data

| RA13 | 1.02907272E−12 | 3.06525203E−12 |
|---|---|---|
| RA14 | 5.19740494E−13 | 2.84165637E−12 |
| RA15 | −1.83177171E−13 | −4.24793926E−13 |
| RA16 | −1.74412406E−16 | 5.14814396E−14 |

TABLE 7

Example 3: Basic Lens Data

| Si Surface Number | Ri Radius of Curvature | Di Distance | Ndj Refractive Index | vdj Abbe's Number |
|---|---|---|---|---|
| 1 | 18.0197 | 0.80 | 1.78590 | 44.2 |
| 2 | 8.8085 | 3.13 | | |
| *3 | −29.3048 | 2.54 | 1.53389 | 56.0 |
| *4 | −15.3177 | 0.26 | | |
| 5 | −387.3951 | 0.70 | 1.78590 | 44.2 |
| 6 | 5.9157 | 2.44 | | |
| 7 | 7.9344 | 1.56 | 1.92286 | 18.9 |
| 8 | 11.3636 | D8 | | |
| 9 | ∞ Aperture Stop | D9 | | |
| *10 | 11.4802 | 1.50 | 1.53389 | 56.0 |
| *11 | 59.6824 | 0.10 | | |
| 12 | 9.5074 | 4.20 | 1.49700 | 81.5 |
| 13 | −11.0673 | 0.92 | | |
| 14 | 14.9169 | 0.74 | 1.92286 | 20.9 |
| 15 | 6.0354 | 0.95 | | |
| 16 | 17.4298 | 2.23 | 1.51742 | 52.4 |
| 17 | −14.7168 | D17 | | |
| 18 | ∞ | 1.01 | 1.51633 | 64.1 |
| 19 | ∞ | 6.79 | | |

*Aspherical Surface

TABLE 8

Example 3: Data Related to Zoom

| Item | Wide Angle End | Telephoto End |
|---|---|---|
| f | 3.19 | 7.98 |
| Fno. | 1.84 | 3.10 |
| 2ω | 93.23 | 43.22 |
| D8 | 12.05 | 3.55 |
| D9 | 7.10 | 0.95 |
| D17 | 0.00 | 6.16 |

TABLE 9

Example 3: Aspherical Surface Data

| | Surface Number | |
|---|---|---|
| | S3 | S4 |
| KA | 1.00000000E+00 | 1.00000000E+00 |
| RA3 | −3.92896399E−04 | −2.13763767E−03 |
| RA4 | 1.59073904E−03 | 2.91750862E−03 |
| RA5 | −5.69315036E−05 | −3.58929668E−04 |
| RA6 | −3.09012532E−05 | −2.16238082E−05 |
| RA7 | 3.08376455E−06 | 3.52532145E−06 |
| RA8 | 2.01913214E−07 | 5.85035760E−07 |
| RA9 | −3.35542117E−08 | 1.83747727E−08 |
| RA10 | 7.17802063E−10 | −1.27915817E−08 |
| RA11 | 4.82375497E−10 | −1.50321640E−09 |
| RA12 | −6.07407734E−11 | 2.23818828E−10 |

TABLE 9-continued

Example 3: Aspherical Surface Data

| | Surface Number | |
|---|---|---|
| | S10 | S11 |
| KA | 1.00000000E+00 | 1.00000000E+00 |
| RA3 | 1.76132207E-03 | 1.62917632E-03 |
| RA4 | -1.20250122E-03 | -2.54326990E-04 |
| RA5 | 6.05031687E-04 | 3.97279047E-04 |
| RA6 | -8.55614525E-05 | -2.21530506E-05 |
| RA7 | -4.99565629E-06 | -9.51075191E-06 |
| RA8 | 6.90298187E-07 | 1.17877317E-06 |
| RA9 | 1.79779961E-07 | -6.41427571E-08 |
| RA10 | 4.74445204E-09 | 6.39564855E-09 |
| RA11 | -4.60842095E-10 | 3.66096527E-09 |
| RA12 | -2.98218247E-10 | 5.76689611E-11 |
| RA13 | 3.48935761E-11 | -1.74705742E-10 |
| RA14 | -1.45031348E-11 | 3.01805056E-11 |
| RA15 | -3.10067265E-12 | -4.18867888E-13 |
| RA16 | 3.84662428E-13 | -7.01204898E-13 |

TABLE 10

Example 4: Basic Lens Data

| Si Surface Number | Ri Radius of Curvature | Di Distance | Ndj Refractive Index | νdj Abbe's Number |
|---|---|---|---|---|
| 1 | 15.0647 | 0.80 | 1.78590 | 44.2 |
| 2 | 8.7870 | 3.39 | | |
| *3 | -12.0041 | 1.68 | 1.53389 | 56.0 |
| *4 | -13.2378 | 0.72 | | |
| 5 | 79.6843 | 0.70 | 1.83481 | 42.7 |
| 6 | 6.0492 | 2.40 | | |
| 7 | 8.3918 | 1.57 | 1.92286 | 18.9 |
| 8 | 12.8384 | D8 | | |
| 9 | ∞ Aperture Stop | D9 | | |
| *10 | 11.5886 | 1.50 | 1.53389 | 56.0 |
| *11 | 62.6674 | 0.10 | | |
| 12 | 9.3886 | 4.14 | 1.49700 | 81.5 |
| 13 | -11.4819 | 0.84 | | |
| 14 | 14.3873 | 0.70 | 1.92286 | 20.9 |
| 15 | 6.0411 | 1.06 | | |
| 16 | 18.2998 | 2.26 | 1.51742 | 52.4 |
| 17 | -14.5710 | D17 | | |
| 18 | ∞ | 1.01 | 1.51633 | 64.1 |
| 19 | ∞ | 6.91 | | |

*Aspherical Surface

TABLE 11

Example 4: Data Related to Zoom

| Item | Wide Angle End | Telephoto End |
|---|---|---|
| f | 3.19 | 7.99 |
| Fno. | 1.85 | 3.10 |
| 2ω | 93.11 | 43.14 |
| D8 | 12.11 | 3.55 |
| D9 | 7.15 | 0.96 |
| D17 | 0.00 | 6.19 |

TABLE 12

Example 4: Aspherical Surface Data

| | Surface Number | |
|---|---|---|
| | S3 | S4 |
| KA | 1.00000000E+00 | 1.00000000E+00 |
| RA3 | 1.97673389E-03 | -5.14428429E-04 |
| RA4 | 1.87516095E-03 | 3.12292451E-03 |
| RA5 | -8.83901056E-05 | -3.73387017E-04 |
| RA6 | -3.46164616E-05 | -2.15361781E-05 |
| RA7 | 3.39216521E-06 | 3.59181888E-06 |
| RA8 | 2.83246128E-07 | 6.11999137E-07 |
| RA9 | -3.25234250E-08 | 2.16820702E-08 |
| RA10 | -1.62438093E-10 | -1.26000740E-08 |
| RA11 | 4.02161038E-10 | -1.56205805E-09 |
| RA12 | -4.93251419E-11 | 2.07287653E-10 |

| | Surface Number | |
|---|---|---|
| | S10 | S11 |
| KA | 1.00000000E+00 | 1.00000000E+00 |
| RA3 | 1.94128295E-03 | 1.86623411E-03 |
| RA4 | -1.23941301E-03 | -3.36191383E-04 |
| RA5 | 6.08149148E-04 | 4.06331604E-04 |
| RA6 | -8.51668505E-05 | -2.18876430E-05 |
| RA7 | -4.93462600E-06 | -9.60813947E-06 |
| RA8 | 6.94019051E-07 | 1.17663239E-06 |
| RA9 | 1.80217543E-07 | -6.42807894E-08 |
| RA10 | 4.56975362E-09 | 6.62207183E-09 |
| RA11 | -4.56633408E-10 | 3.67837311E-09 |
| RA12 | -2.91798675E-10 | 6.28058891E-11 |
| RA13 | 3.76317402E-11 | -1.70699217E-10 |
| RA14 | -1.38781021E-11 | 3.16879777E-11 |
| RA15 | -2.99033991E-12 | 2.08736136E-13 |
| RA16 | 3.59472958E-13 | -8.60992007E-13 |

TABLE 13

Example 5: Basic Lens Data

| Si Surface Number | Ri Radius of Curvature | Di Distance | Ndj Refractive Index | νdj Abbe's Number |
|---|---|---|---|---|
| 1 | 17.7205 | 0.80 | 1.78590 | 44.2 |
| 2 | 8.7860 | 3.01 | | |
| *3 | -36.6744 | 2.61 | 1.53389 | 56.0 |
| *4 | -19.6099 | 0.39 | | |
| 5 | 421.7536 | 0.70 | 1.78590 | 44.2 |
| 6 | 5.9262 | 2.47 | | |
| 7 | 8.0207 | 1.54 | 1.92286 | 18.9 |
| 8 | 11.4973 | D8 | | |
| 9 | ∞ Aperture Stop | D9 | | |
| *10 | 11.3062 | 1.50 | 1.53389 | 56.0 |
| *11 | 55.2334 | 0.10 | | |
| 12 | 9.4789 | 4.16 | 1.49700 | 81.5 |
| 13 | -11.2650 | 0.92 | | |
| 14 | 14.8237 | 0.70 | 1.92286 | 20.9 |
| 15 | 6.0417 | 0.94 | | |
| 16 | 16.2485 | 2.19 | 1.51742 | 52.4 |
| 17 | -15.4996 | D17 | | |
| 18 | ∞ | 1.01 | 1.51633 | 64.1 |
| 19 | ∞ | 6.85 | | |

*Aspherical Surface

TABLE 14

Example 5: Data Related to Zoom

| Item | Wide Angle End | Telephoto End |
|---|---|---|
| f | 3.20 | 7.99 |
| Fno. | 1.85 | 3.10 |

TABLE 14-continued

Example 5: Data Related to Zoom

| Item | Wide Angle End | Telephoto End |
|---|---|---|
| 2ω | 93.25 | 43.15 |
| D8 | 12.04 | 3.55 |
| D9 | 7.09 | 0.95 |
| D17 | 0.00 | 6.14 |

TABLE 15

Example 5: Aspherical Surface Data

| | Surface Number | |
|---|---|---|
| | S3 | S4 |
| KA | 1.00000000E+00 | 1.00000000E+00 |
| RA3 | −4.30601440E−04 | −2.45942098E−03 |
| RA4 | 1.43624994E−03 | 2.89828666E−03 |
| RA5 | −3.55884451E−05 | −3.71151955E−04 |
| RA6 | −3.08553414E−05 | −2.14177604E−05 |
| RA7 | 2.83817696E−06 | 3.61955608E−06 |
| RA8 | 1.79586380E−07 | 5.91009605E−07 |
| RA9 | −3.24112553E−08 | 1.81447671E−08 |
| RA10 | 1.20108913E−09 | −1.28743984E−08 |
| RA11 | 5.15204525E−10 | −1.51244540E−09 |
| RA12 | −6.86137874E−11 | 2.22680423E−10 |

| | Surface Number | |
|---|---|---|
| | S10 | S11 |
| KA | 1.00000000E+00 | 1.00000000E+00 |
| RA3 | 1.76814202E−03 | 1.62203935E−03 |
| RA4 | −1.21678337E−03 | −2.45116314E−04 |
| RA5 | 6.06179046E−04 | 3.88478822E−04 |
| RA6 | −8.58569578E−05 | −2.21235612E−05 |
| RA7 | −4.99796243E−06 | −9.42747893E−06 |
| RA8 | 6.97601547E−07 | 1.19048864E−06 |
| RA9 | 1.81003252E−07 | −6.30576600E−08 |
| RA10 | 4.91247208E−09 | 6.49947884E−09 |
| RA11 | −4.43304548E−10 | 3.66517494E−09 |
| RA12 | −2.94072014E−10 | 5.85100526E−11 |
| RA13 | 3.45122935E−11 | −1.74157715E−10 |
| RA14 | −1.43374070E−11 | 2.94645898E−11 |
| RA15 | −3.18348899E−12 | −4.90574065E−13 |
| RA16 | 3.91257516E−13 | −6.76391292E−13 |

TABLE 16

Example 6: Basic Lens Data

| Si Surface Number | Ri Radius of Curvature | Di Distance | Ndj Refractive Index | νdj Abbe's Number |
|---|---|---|---|---|
| 1 | 17.9420 | 0.80 | 1.78590 | 44.2 |
| 2 | 8.7868 | 2.94 | | |
| *3 | −70.8941 | 2.93 | 1.53389 | 56.0 |
| *4 | −26.6446 | 0.37 | | |
| 5 | 400.8261 | 0.70 | 1.78590 | 44.2 |
| 6 | 5.8867 | 2.44 | | |
| 7 | 8.1404 | 1.54 | 1.92286 | 18.9 |
| 8 | 11.8520 | D8 | | |
| 9 | ∞ Aperture Stop | D9 | | |
| *10 | 11.2098 | 1.50 | 1.53389 | 56.0 |
| *11 | 52.9915 | 0.10 | | |
| 12 | 9.2969 | 4.14 | 1.49700 | 81.5 |
| 13 | −11.5666 | 0.87 | | |
| 14 | 14.2844 | 0.70 | 1.92286 | 20.9 |
| 15 | 5.9671 | 0.95 | | |
| 16 | 15.0986 | 2.25 | 1.51742 | 52.4 |
| 17 | −16.6844 | D17 | | |
| 18 | ∞ | 1.01 | 1.51633 | 64.1 |
| 19 | ∞ | 6.81 | | |

*Aspherical Surface

TABLE 17

Example 6: Data Related to Zoom

| Item | Wide Angle End | Telephoto End |
|---|---|---|
| f | 3.18 | 7.95 |
| Fno. | 1.84 | 3.10 |
| 2ω | 93.44 | 43.18 |
| D8 | 11.88 | 3.55 |
| D9 | 7.11 | 0.96 |
| D17 | 0.00 | 6.15 |

TABLE 18

Example 6: Aspherical Surface Data

| | Surface Number | |
|---|---|---|
| | S3 | S4 |
| KA | 1.00000000E+00 | 1.00000000E+00 |
| RA3 | 1.15512555E−03 | −1.94623465E−03 |
| RA4 | 4.63209518E−04 | 2.52796589E−03 |
| RA5 | 1.00473917E−04 | −3.74279507E−04 |
| RA6 | −2.62873609E−05 | −1.43978882E−05 |
| RA7 | 1.35555017E−06 | 4.10668149E−06 |
| RA8 | 5.74392491E−09 | 5.42252724E−07 |
| RA9 | −2.60745641E−08 | 4.15486735E−09 |
| RA10 | 5.11033586E−09 | −1.45090144E−08 |
| RA11 | 8.64355180E−10 | −1.53424052E−09 |
| RA12 | −1.44079980E−10 | 2.60125627E−10 |

| | Surface Number | |
|---|---|---|
| | S10 | S11 |
| KA | 1.00000000E+00 | 1.00000000E+00 |
| RA3 | 1.92172358E−03 | 1.98334763E−03 |
| RA4 | −1.18082835E−03 | −3.45009857E−04 |
| RA5 | 5.95776768E−04 | 4.03232975E−04 |
| RA6 | −8.55219828E−05 | −2.20337853E−05 |
| RA7 | −4.72078410E−06 | −9.21699036E−06 |
| RA8 | 7.37744871E−07 | 1.20539081E−06 |
| RA9 | 1.82849964E−07 | −6.65042934E−08 |
| RA10 | 5.54926203E−09 | 5.97488617E−09 |
| RA11 | −3.93487769E−10 | 3.82001970E−09 |
| RA12 | −2.92839034E−10 | 9.08656714E−11 |
| RA13 | 3.11584436E−11 | −1.56124185E−10 |
| RA14 | −1.47954864E−11 | 2.62156555E−11 |
| RA15 | −2.87211663E−12 | 1.04054388E−12 |
| RA16 | 3.00829759E−13 | −1.03639592E−12 |

Table 19 shows values corresponding to Conditional Formulae (1-1) through (1-5), (2-1) through (2-5), and (3) through (9) of the zoom lenses of Examples 1 through 6. The values shown here are the values of the conditions determined by each of the conditional formulae, that is, the variable portions thereof. For example, values of $fw/f_2$ are shown in the row "Conditional Formula (3)". The conditions determined by all of Conditional Formulae (1-1) through (1-5) are $fw/f_{G12}$. Therefore, these conditional formulae are summarized and the values of $fw/f_{G12}$ are shown in the row "Conditional Formula (1)". The conditions determined by all of Conditional Formulae (2-1) through (2-5) are $f_1/f_{G12}$. Therefore, these conditional formulae are summarized and the values of $f_1/f_{G12}$ are shown in the row "Conditional Formula (2)". The values in Table 19 are related to the d line.

TABLE 19

|  | Example 1 | Example 2 | Example 3 | Example 4 | Example 5 | Example 6 |
|---|---|---|---|---|---|---|
| Conditional Formula (1) | 0.019 | 0.015 | 0.056 | −0.007 | 0.043 | 0.041 |
| Conditional Formula (2) | −0.046 | −0.033 | −0.138 | 0.017 | −0.104 | −0.099 |
| Conditional Formula (3) | 0.317 | 0.344 | 0.319 | 0.317 | 0.320 | 0.320 |
| Conditional Formula (4) | 0.774 | 0.758 | 0.778 | 0.775 | 0.781 | 0.777 |
| Conditional Formula (5) | 0.409 | 0.453 | 0.409 | 0.409 | 0.410 | 0.412 |
| Conditional Formula (6) | 0.373 | 0.345 | 0.324 | 0.445 | 0.284 | 0.234 |
| Conditional Formula (7) | 10.726 | 0.279 | 3.190 | −20.460 | 3.298 | 2.204 |
| Conditional Formula (8) | 3.194 | 4.653 | 2.913 | 3.799 | 2.967 | 2.920 |
| Conditional Formula (9) | 2.374 | 2.006 | 2.386 | 2.369 | 2.372 | 2.369 |

Figure 7:
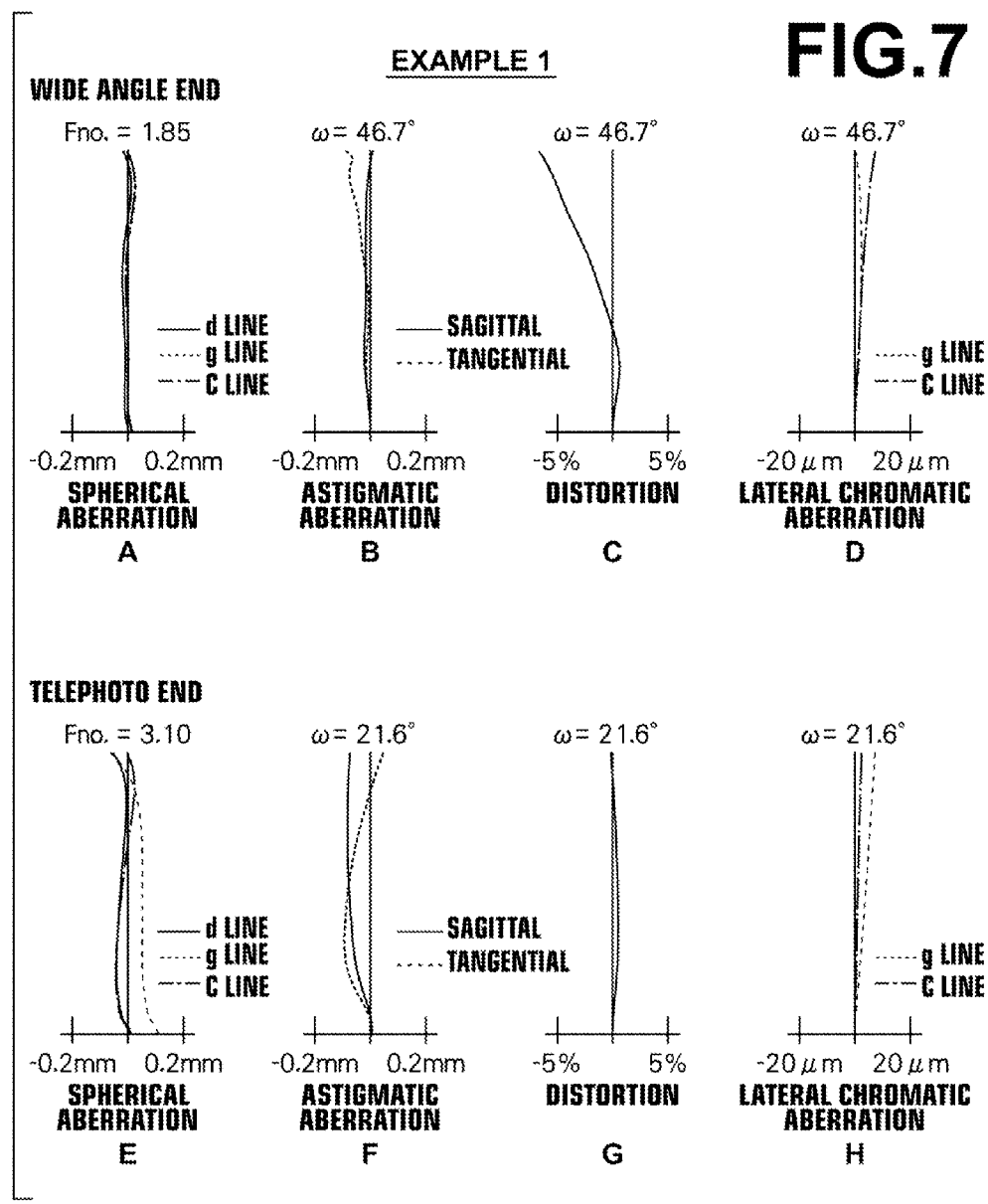
FIG. 7 is a collection of graphs A through H that illustrate various aberrations of the zoom lens of the first embodiment.

The spherical aberration, the astigmatic aberration, the distortion, and the lateral chromatic aberration of the zoom lens of Example 1 at the wide angle end are illustrated in Figure A through D of FIG. 7, respectively. The spherical aberration, the astigmatic aberration, the distortion, and the lateral chromatic aberration of the zoom lens of Example 1 at the telephoto end are illustrated in E through H of FIG. 7, respectively.

Each of the diagrams that illustrate the aberrations use the d line (wavelength: 587.6 nm) as a standard. However, aberrations related to the g line (wavelength: 435.8 nm) and the C line (wavelength: 656.3 nm) are also shown in the diagrams that illustrate spherical aberration. In the diagrams that illustrate astigmatic aberrations, aberrations in the sagittal direction are indicated by solid lines, while aberrations in the tangential direction are indicated by broken lines. In the diagrams that illustrate spherical aberrations, "Fno." denotes F values. In the other diagrams that illustrate the aberrations, ω denotes half angles of view.

Figure 8:
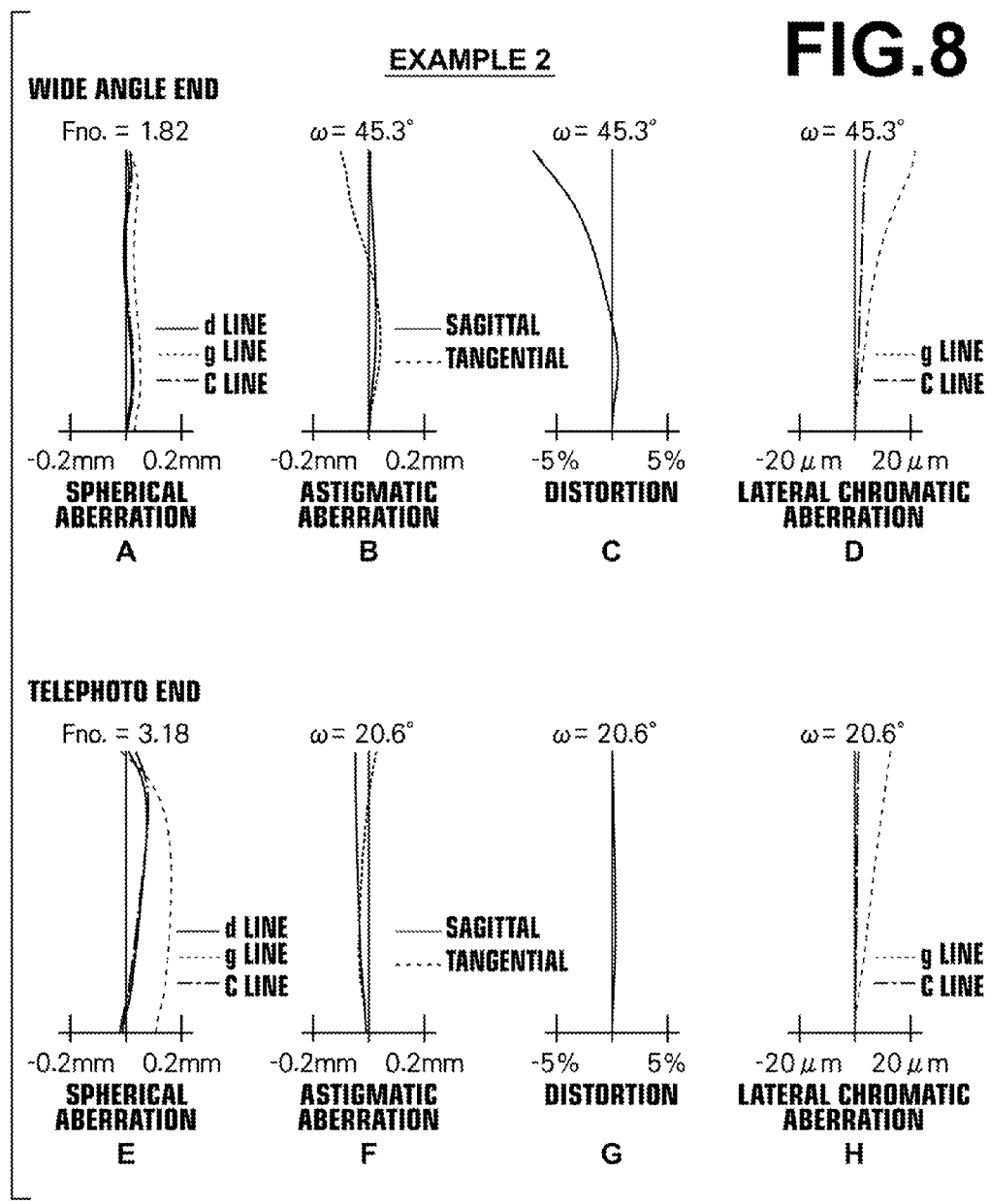
FIG. 8 is a collection of graphs A through H that illustrate various aberrations of the zoom lens of the second embodiment.
Figure 9:
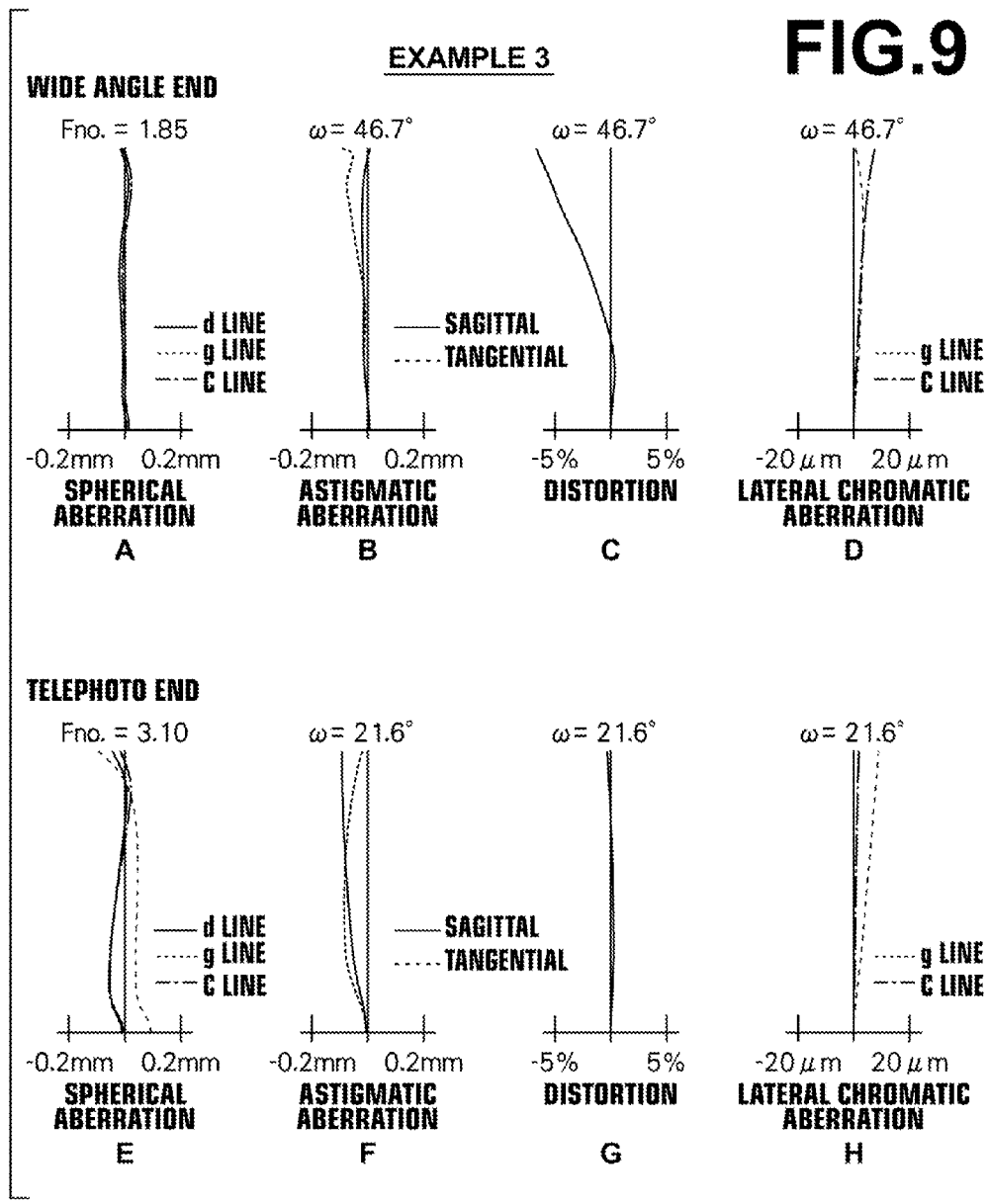
FIG. 9 is a collection of graphs A through H that illustrate various aberrations of the zoom lens of the third embodiment.
Figure 10:
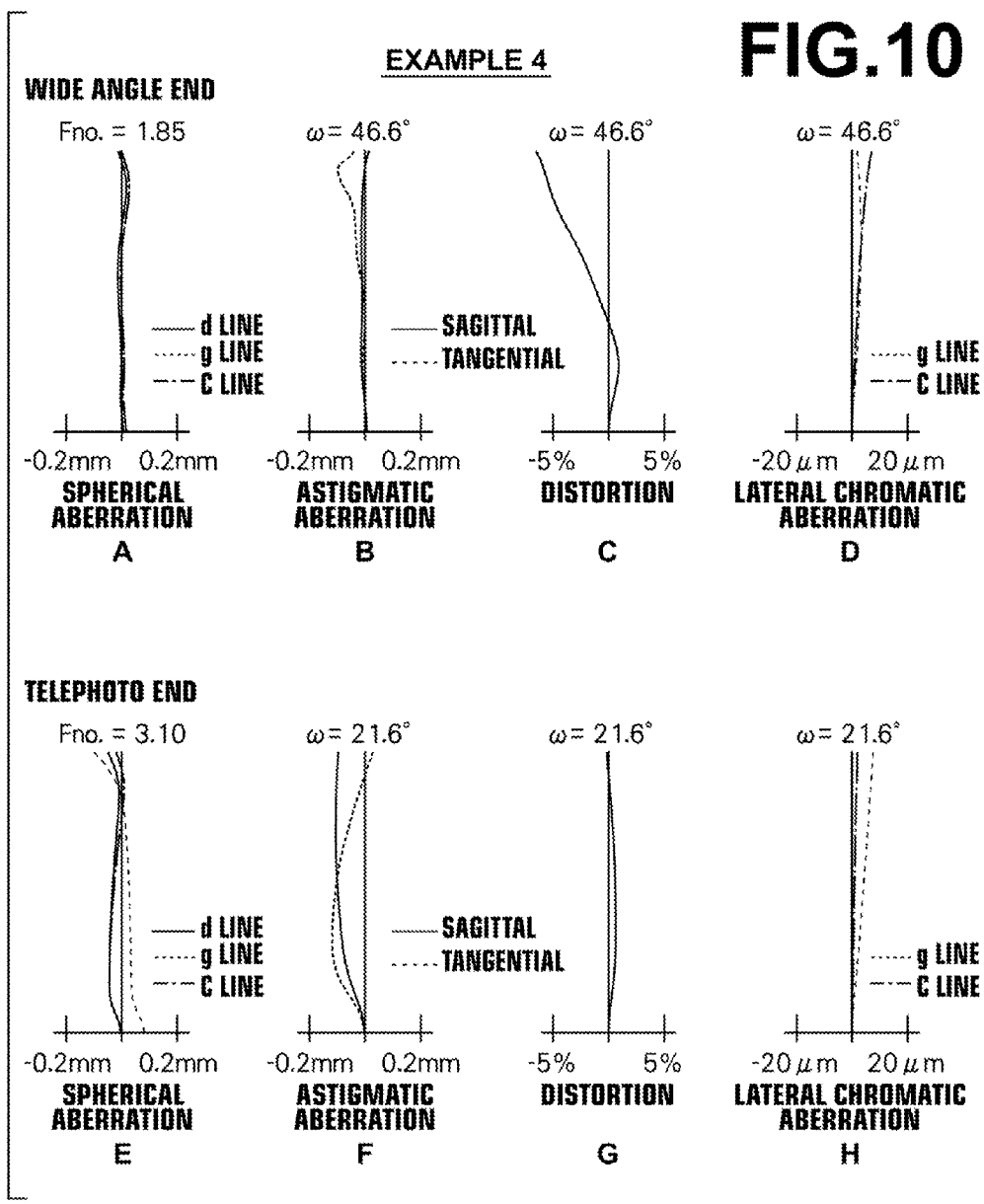
FIG. 10 is a collection of graphs A through H that illustrate various aberrations of the zoom lens of the fourth embodiment.
Figure 11:
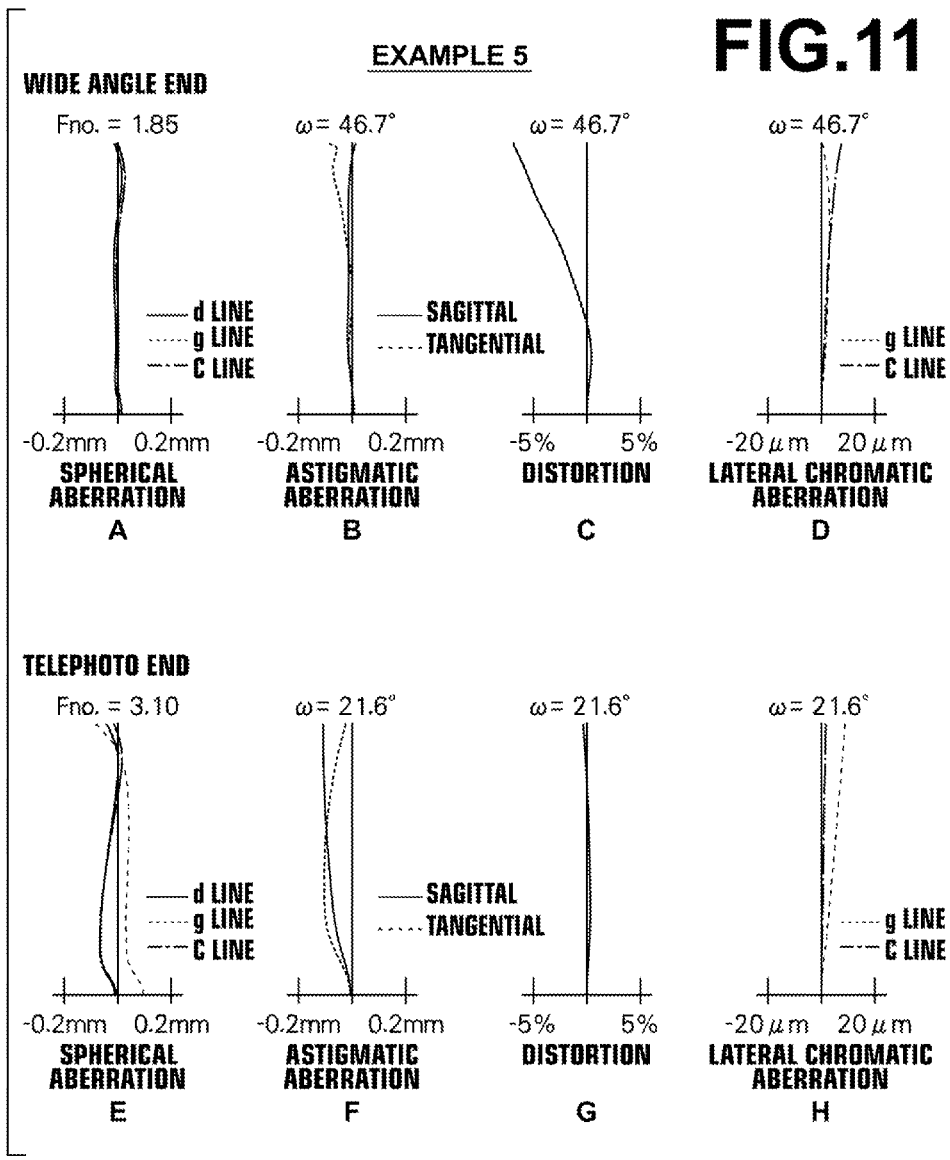
FIG. 11 is a collection of graphs A through H that illustrate various aberrations of the zoom lens of the fifth embodiment.
Figure 12:
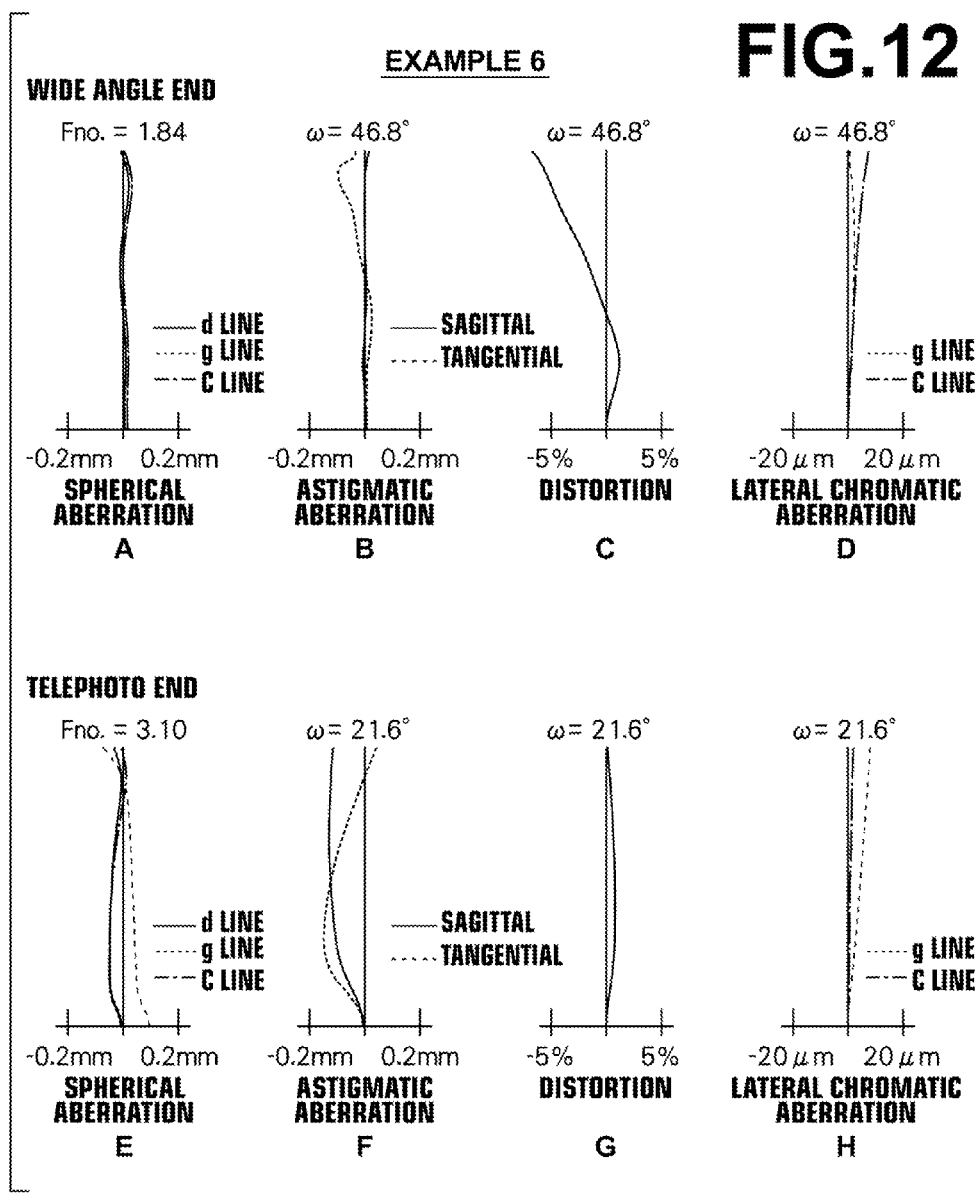
FIG. 12 is a collection of graphs A through H that illustrate various aberrations of the zoom lens of the sixth embodiment.

Similarly, the aberrations of the zoom lens of Example 2 are illustrated in A through D of FIG. 8. In addition, the aberrations of the zoom lenses of Examples 3 through 6 are illustrated in FIG. 9 through FIG. 12.

Figure 13:
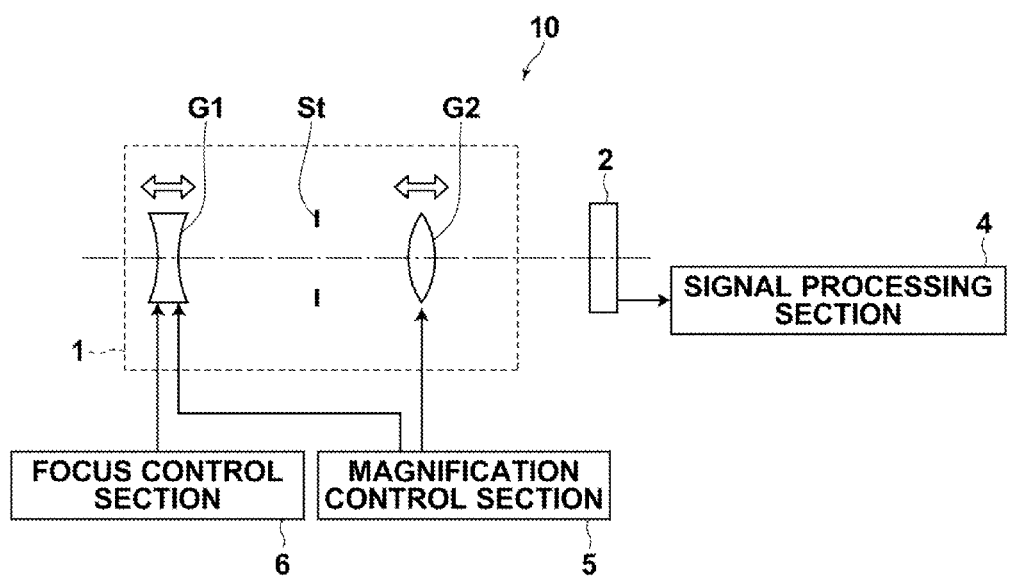
FIG. 13 is a diagram that schematically illustrates an imaging apparatus according to an embodiment of the present invention.

Next, an imaging apparatus according to an embodiment of the present invention will be described. FIG. 13 is a diagram that schematically illustrates an imaging apparatus 10 according to the embodiment of the present invention that employs the zoom lens 1 of the embodiment of the present invention. The imaging apparatus may be a surveillance camera, a video camera, an electronic still camera, or the like.

The imaging apparatus 10 illustrated in FIG. 13 is equipped with: the zoom lens 1; an imaging device 2 that captures images of subjects focused by the zoom lens 1, provided toward the image side of the zoom lens 1; a signal processing section 4 that processes signals output from the imaging device 2; a magnification control section 5 that changes the magnification of the zoom lens 1; and a focus control section 6 that performs focus adjustments. Note that various filters and the like may be provided between the zoom lens 1 and the imaging device 2 as appropriate.

The zoom lens 1 has the first lens group G1 having a negative refractive power that moves along a trajectory which is convex toward the image side when changing magnification from the wide angle end to the telephoto end, the second lens group G2 having a positive refractive power that moves monotonously toward the object side when changing magnification from the wide angle end to the telephoto end, and the fixed aperture stop St. Note that the lens groups are schematically illustrated in FIG. 13.

The imaging device 2 captures an optical image formed by the zoom lens 1 and outputs electrical signals. The imaging surface thereof is provided to match the imaging plane of the zoom lens 1. A CCD, a CMOS, or the like may be employed as the imaging device 2.

Note that although not illustrated in FIG. 13, the imaging apparatus 10 may be further equipped with a blur correcting mechanism that moves a lens having a positive refractive power that constitutes a portion of the second lens group G2, for example, in a direction perpendicular to the optical axis Z in order to correct blurring of obtained images due to vibration or shaky hands.

The imaging apparatus 10 is equipped with the zoom lens of the present invention that exhibits the advantageous effects described above. Therefore, favorable optical performance can be obtained, and miniaturization, cost reduction, and a wide angle of view can be achieved.

The present invention has been described with reference to the embodiments and Examples thereof. However, the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

What is claimed is:

1. A zoom lens, comprising:
a first lens group having a negative refractive power; and
a second lens group having a positive refractive power, provided in this order from an object side;
the first lens group and the second lens group being moved to change magnification;
the first lens group comprising a first lens having a negative refractive power, a second lens, a third lens having a negative refractive power, and a fourth lens having a positive refractive power, in this order from the object side;
the second lens group comprising four lenses; and
the zoom lens satisfying both of the following Conditional Formulae (1-4) and (2-4) and at least one of the following Conditional Formulae (1-5) and (2-5):

$$-0.50 < fw/f_{G12} < 0.17 \quad (1\text{-}4)$$

$$-1.00 < f_1/f_{G12} < 0.16 \quad (2\text{-}4)$$

$$-0.20 < fw/f_{G12} < 0.10 \quad (1\text{-}5)$$

$$-0.50 < f_1/f_{G12} < 0.05 \quad (2\text{-}5)$$

wherein $f_{G12}$ is the focal length of the second lens from the object side within the first lens group, fw is the focal length of the entire system at a wide angle end, and $f_1$ is the focal length of the first lens group,
and the zoom lens also satisfies the following Conditional formula (6):

$$0.20 < H_{G12F} \cdot \{(1/r'_{G12F}) - (1/r''_{G12F})\} \quad (6)$$

wherein $H_{G12F}$ is maximum effective radius of the surface toward the object side of the second lens from the object side within the first lens group, $r'_{G12F}$ is the radius of curvature of a spherical surface that passes through the center of the surface of the second lens toward the object side and a point at a height $H_{G12F}$ from the optical axis and has the center of the surface as its apex, and $r''_{G12F}$ is the radius of curvature of a spherical surface that passes through the center of the surface of the second lens toward the object side and a point at a height $H_{G12F} \cdot 0.5$ from the optical axis and has the center of the surface as its apex.

2. The zoom lens as defined in claim 1, in which the focal lengths $f_{G12}$, fw, and $f_1$ satisfy at least one of the following conditional formulae:

$$-0.01 < fw/f_{G12} < 0.06 \quad (1\text{-}3)$$

$$-0.15 < f_1/f_{G12} < 0.05 \quad (2\text{-}3).$$

3. The zoom lens as defined in claim 1 that satisfies the following conditional formula:

$$0.31 < fw/f_2 < 0.49 \quad (3)$$

wherein fw is the focal length of the entire system at the wide angle end, and $f_2$ is the focal length of the second lens group.

4. The zoom lens as defined in claim 3 that satisfies the following conditional formula:

$$0.31 < fw/f_2 < 0.35 \quad (3').$$

5. The zoom lens as defined in claim 1 that satisfies the following conditional formula:

$$0.56 < |f_1/f_2| < 1.04 \quad (4)$$

wherein $f_1$ is the focal length of the first lens group G1, and $f_2$ is the focal length of the second lens group.

6. The zoom lens as defined in claim 5 that satisfies the following conditional formula:

$$0.70 < |f_1/f_2| < 0.80 \quad (4').$$

7. The zoom lens as defined in claim 1 that satisfies the following conditional formula:

$$0.00 < |fw/f_1| < 0.63 \quad (5)$$

wherein $f_1$ is the focal length of the first lens group, and fw is the focal length of the entire system at the wide angle end.

8. The zoom lens as defined in claim 7 that satisfies the following conditional formula:

$$0.20 < |fw/f_1| < 0.50 \quad (5').$$

9. The zoom lens as defined in claim 1 that satisfies the following conditional formula:

$$0.20 < H_{G12F} \cdot \{(1/r'_{G12F}) - (1/r''_{G12F})\} < 0.50 \quad (6').$$

10. The zoom lens as defined in claim 1 that satisfies the following conditional formula:

$$2.0 < (r_{G12F} + r_{G12R})/(r_{G12F} - r_{G12R}) < 30.0 \quad (7)$$

wherein $r_{G12F}$ is the paraxial radius of curvature of the surface toward the object side of the second lens from the object side within the first lens group, and $r_{G12R}$ is the paraxial radius of curvature of the surface toward the image side of the second lens from the object side within the first lens group.

11. The zoom lens as defined in claim 10 that satisfies the following conditional formula:

$$2.0 < (r_{G12F} + r_{G12R})/(r_{G12F} - r_{G12R}) < 15.0 \quad (7').$$

12. The zoom lens as defined in claim 1 that satisfies the following conditional formula:

$$2.5 < (r_{G11F} + r_{G11R})/(r_{G11F} - r_{G11R}) < 10.0 \quad (8)$$

wherein $r_{G11F}$ is the paraxial radius of curvature of the surface toward the object side of the first lens from the object side within the first lens group, and $r_{G11R}$ is the paraxial radius of curvature of the surface toward the image side of the first lens from the object side within the first lens group.

13. The zoom lens as defined in claim 12 that satisfies the following conditional formula:

$$2.8 < (r_{G11F} + r_{G11R})/(r_{G11F} - r_{G11R}) < 4.0 \quad (8').$$

14. The zoom lens as defined in claim 1 that satisfies the following conditional formula:

$$1.3 < f_{G21}/f_{G22} < 3.0 \quad (9)$$

wherein $f_{G21}$ is the focal length of the first lens from the object side within the second lens group, and $f_{G22}$ is the focal length of the second lens from the object side within the second lens group.

15. The zoom lens as defined in claim 14 that satisfies the following conditional formula:

$$2.0 < f_{G21}/f_{G22} < 2.5 \quad (9').$$

16. An imaging apparatus comprising a zoom lens as defined in claim 1.

* * * * *